(12) United States Patent
Roe et al.

(10) Patent No.: US 12,187,972 B1
(45) Date of Patent: Jan. 7, 2025

(54) AQUEOUS SOLUTIONS AND METHODS OF USING SAME FOR REMEDIATING CONTAMINANTS IN CONTAMINATED GASSES

(71) Applicant: GAPS Technology, LLC, Slidell, LA (US)

(72) Inventors: Cliffton L. Roe, Harrison Township, MI (US); Gerald A. Pourciau, Slidell, LA (US)

(73) Assignee: Gaps Technology, LLC., Slidell, LA (US)

( * ) Notice: Subject to any disclaimer, the term of this patent is extended or adjusted under 35 U.S.C. 154(b) by 0 days.

(21) Appl. No.: 18/769,774

(22) Filed: Jul. 11, 2024

Related U.S. Application Data

(63) Continuation of application No. 18/616,544, filed on Mar. 26, 2024, which is a continuation of application No. PCT/US2023/031403, filed on Aug. 29, 2023.
(Continued)

(51) Int. Cl.
*C10L 3/10* (2006.01)
*B01D 53/34* (2006.01)
(Continued)

(52) U.S. Cl.
CPC ............ *C10L 3/103* (2013.01); *B01D 53/346* (2013.01); *B01D 53/507* (2013.01); *B01D 53/52* (2013.01);
(Continued)

(58) Field of Classification Search
CPC .......... C10L 3/103; C10L 3/104; C10L 3/105; C10L 3/106; C10L 2290/545;
(Continued)

(56) References Cited

U.S. PATENT DOCUMENTS

| | | | |
|---|---|---|---|
| 2,592,523 | A | 4/1952 | Ayers et al. |
| 3,262,753 | A | 7/1966 | Urano et al. |

(Continued)

FOREIGN PATENT DOCUMENTS

| | | |
|---|---|---|
| EP | 0 432 858 A1 | 6/1991 |
| RU | 2286446 C1 | 10/2006 |

(Continued)

OTHER PUBLICATIONS

Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.
(Continued)

*Primary Examiner* — Ali Z Fadhel
(74) *Attorney, Agent, or Firm* — Carrier, Shende & Associates P.C.; Joseph P. Carrier; Fulchand P. Shende

(57) ABSTRACT

A treatment process for removing and/or remediating contaminants in a contaminated gas includes flowing a stream of the contaminated gas through a pipeline, treating the flowing stream of the contaminated gas by injecting droplets of a liquid treatment composition containing 35-55 wt % total of one or more hydroxide compounds into the flowing the stream of the contaminated gas in the pipeline such that the liquid treatment composition mixes into the contaminated gas in the flowing stream and remediates contaminants in the contaminated gas, injecting water into the mixed flowing the stream of the contaminated gas and the liquid treatment composition in the pipeline downstream of where the liquid treatment composition is injected into the pipeline, and separating the flowing stream of the treated contaminated gas from any remaining amount of the liquid treatment composition, the water and the precipitates in a separator.

22 Claims, 5 Drawing Sheets

Related U.S. Application Data

(60) Provisional application No. 63/401,882, filed on Aug. 29, 2022.

(51) Int. Cl.
  B01D 53/50 (2006.01)
  B01D 53/52 (2006.01)
  B01D 53/62 (2006.01)
  B01D 53/72 (2006.01)

(52) U.S. Cl.
  CPC .............. *B01D 53/62* (2013.01); *B01D 53/72* (2013.01); *C10L 3/104* (2013.01); *C10L 3/105* (2013.01); *C10L 3/106* (2013.01); *B01D 2251/604* (2013.01); *B01D 2257/302* (2013.01); *B01D 2257/304* (2013.01); *B01D 2257/306* (2013.01); *B01D 2257/504* (2013.01); *B01D 2257/7027* (2013.01); *B01D 2258/0283* (2013.01); *C10L 2290/545* (2013.01)

(58) Field of Classification Search
  CPC .... B01D 53/346; B01D 53/507; B01D 53/52; B01D 53/62; B01D 53/72; B01D 2251/604; B01D 2257/302; B01D 2257/304; B01D 2257/306; B01D 2257/504; B01D 2257/7027; B01D 2258/083
  See application file for complete search history.

(56) References Cited

U.S. PATENT DOCUMENTS

| | | | |
|---|---|---|---|
| 3,586,622 | A | 6/1971 | Thompson |
| 3,708,421 | A | 1/1973 | Rippie |
| 3,897,219 | A | 7/1975 | Sibeud et al. |
| 4,417,986 | A | 11/1983 | Connaught et al. |
| 4,746,442 | A | 5/1988 | Calemma et al. |
| 4,748,011 | A * | 5/1988 | Baize ................. C07C 7/14875 423/234 |
| 5,635,056 | A | 6/1997 | Brons et al. |
| 5,667,760 | A | 9/1997 | Sweeney |
| 6,416,725 | B1 * | 7/2002 | Spink ..................... B01D 53/52 423/220 |
| 7,914,669 | B2 | 3/2011 | Martinie et al. |
| 7,964,170 | B2 * | 6/2011 | Singh .................. B01D 53/501 502/172 |
| 7,998,446 | B2 * | 8/2011 | Pfeffer ..................... C01B 17/74 423/539 |
| 9,028,679 | B2 | 5/2015 | Morris |
| 10,550,337 | B2 | 2/2020 | Roe et al. |
| 10,876,052 | B2 * | 12/2020 | Ramkumar ........ B01D 53/1468 |
| 10,913,911 | B1 * | 2/2021 | Roe .......................... C10L 3/104 |
| 2003/0132104 | A1 | 7/2003 | Yamashita et al. |
| 2006/0185985 | A1 | 8/2006 | Jones |
| 2009/0065399 | A1 | 3/2009 | Kocal et al. |
| 2010/0056404 | A1 | 3/2010 | Talley |
| 2010/0275781 | A1 | 11/2010 | Tsangaris et al. |
| 2013/0323143 | A1 | 12/2013 | Olfi et al. |
| 2014/0127107 | A1 * | 5/2014 | Suchak .................. B01D 53/75 423/210 |
| 2015/0037274 | A1 | 2/2015 | Walia et al. |
| 2020/0239789 | A1 | 7/2020 | Roe et al. |
| 2021/0230487 | A1 * | 7/2021 | Roe ......................... C10G 29/08 |

FOREIGN PATENT DOCUMENTS

| | | |
|---|---|---|
| WO | 2019/036731 A2 | 2/2019 |
| WO | 2019/209379 A1 | 10/2019 |
| WO | 2022/008253 A1 | 1/2022 |

OTHER PUBLICATIONS

Mike Nicholson/Tim O'Brian, Baker Petrolite Corporation, "Hydrogen Sulfide in Petroleum", pp. 1-28, found at www.coqa-inc.org/docs/default-source/meeting-presentations/20010531H25.pdf.

Heitman et al., "Oxidation and incorporation of hydrogen sulfide by dissolved organic matter", Chemical Geology 235 (2006), pp. 12-20.

Yang et al., "Novel Process of Removal of Sulfur Dioxide by Aqueous Ammonia-Fulvic Acid Solution with Ammonia Escape Inhibition", energy&fuels article 2016, 30, pp. 3205-3218.

Pohlabein et al., "Experimental Evidence for Abiotic Sulfurization of Marine Dissolved Organic Matter", frontiers in Marine Science,, published Nov. 15, 2017, vol. 4, Article 364, pp. 1-11.

Shi X, Li Q,Wang T, Lackner KS (2017), "Kinetic analysis of an anion exchange absorbent for CO2 capture fromambient air." PLoS One 12(6): e0179828. https://doi.org/10.1371/journal. pone. 0179828, pp. 1-12.

Elliot, Louis D., "The freezing point curve of the system water-ammonia", The Journal of Physical Chemistry 28.8 (Aug. 1924): pp. 887-888, Figure 1.

Bauer et al., "Electron Transfer Capacities and Reaction Kinetics of Peat Dissolved Organic Matter", Environmental Science & Technology, vol. 41, No. 1, 2007, pp. 139-145.

Boggs et al., "Humic Substances In Natural Waters And Their Complexation With Trace Metals And Radionuclides: A Review", Argonne National Laboratory, Illinois, 60439, Chemical Technology Division, Jul. 1985.

Einsiedl et al., "Evidence for Incorporation of H2S in Groundwater Fulvic Acids from Stable Isotope Ratios and Sulfur K-edge X-ray Absorption Near Edge Structure Spectroscopy", Environmental Science & Technology, vol. 42, No. 7, 2008, pp. 2439-2444.

Einseidl et al., "Combined sulfur K-edge XANES spectroscopy and stable isotope analyses of fulvic acids and groundwater sulfate identify sulfur cycling in a karstic catchment area", Chemical Geology, 238, 2007, pp. 268-276.

Perlinger et al., "Addition of Hydrogen Sulfide to Juglone", Environmental Science & Technology, vol. 36, No. 12, 2002, pp. 2663-2669.

Senesi et al., "The Role of Free Radicals in the Oxidation and Reduction of Fulvic Acid", Soil Research Institute, Agriculture Canada, Soil Biol. Biochem. vol. 9, 1977, pp. 397-403.

Zhiguo Yu, "Electron Transfer Processes between Hydrogen Sulfide and Humic Substances—Implications for Anaerobic Sulfur Cycling in Freshwater Ecosystems", Dissertation to obtain the degree of Doctor of Natural Sciences at the Faculty of Biology / Chemistry / Earth Sciences.

Baguena, Beltran, "Humic acids and Fulvic acids I Humic Acids: Interview with D. Gregorio Murillo by the communications department of ACEA" Jilco Industrial, SA, (2019) (obtained from acidoshumicos.com Nov. 2019) (Year: 2019).

Panza et al., "Hydrogen sulphide removal from landfill gas", Process Safety and Environmental Protection 88, 2010, pp. 420-424.

* cited by examiner

AQUEOUS SOLUTIONS AND METHODS OF USING SAME FOR REMEDIATING CONTAMINANTS IN CONTAMINATED GASSES

CROSS-REFERENCE TO RELATED APPLICATIONS

This application is a Continuation of U.S. patent application Ser. No. 18/616,544, filed Mar. 26, 2024, which is a Continuation of International Application PCT/US2023/031403, filed 29 Aug. 2023, which claims priority to U.S. Provisional Patent Application No. 63/401,882, filed 29 Aug. 2022. The entire subject matter of each of these priority applications is incorporated by reference herein.

BACKGROUND OF THE INVENTION

1. Field of the Invention

The present disclosure relates to improved aqueous treatment solutions and treatment methods using the aqueous treatment solutions for remediating contaminants, including sulfur-containing compounds including $H_2S$, mercaptans, thiophenes and BTEX (benzene, toluene, ethylbenzene, xylenes), etc. and other contaminants including $CO_2$, $SO_2$, metals, salts, etc. in contaminated gasses including natural gas, emission gasses from fossil fuel combustion, etc. More particularly, the present disclosure relates to such treatment solutions and treatment methods which may be used as a novel treatment or pretreatment of contaminated gasses whereby multiple contaminants in the gasses are remediated down to significantly reduced levels in a highly efficient and economically practical manner.

2. Background

Sulfur-containing compounds including hydrogen sulfide ($H_2S$), mercaptans, thiophenes and BTEX have long been recognized as undesirable contaminants in contaminated fluids, particularly in hydrocarbon fluids such as crude oil and natural gas. $H_2S$ is a particularly undesirable contaminant because it is highly toxic, corrosive, etc. and generally hydrocarbon fluids should contain less than five ppm $H_2S$. Remediation of $H_2S$ in hydrocarbon fluids has long been and remains a very important focus of petroleum industries around the world, and typically natural gas is regulated by governments around the world to contain no more than 4-5 ppm in order to be sold or used.

Treating of contaminated liquids such as crude oil can be challenging, but there are many known treatment compositions and treatment processes for such purpose, including some treatment compositions and treatment processes previously proposed by one of the present inventors, e.g., those disclosed in International Patent Application Nos. PCT/US2018/050913 and PCT/US2018/064015, the entire contents of which are incorporated herein by reference. In such processes previously proposed by one of the present inventors, the treatment compositions may be directly added to or combined with contaminated liquids such that chemicals included in treatment compositions, primarily hydroxide compounds, can react with the contaminants to remediate the contaminants into other, less problematic, non-toxic compounds which may stay in the treated liquids or precipitate out of the treated liquids.

One of the present inventors' prior proposals for treating contaminated liquids, as disclosed in PCT/US2018/050913, involves an aqueous treatment composition containing primarily a high concentration of one or more hydroxides such as sodium hydroxide (NaOH) and potassium hydroxide (KOH), e.g., collectively the hydroxides account for 35-55 weight percent, and preferably at least 45 weight percent of the treatment solution, which efficiently react with $H_2S$ to convert it to non-toxic substances. Such treatment solution according to the recent proposal is highly alkaline with a pH of 13-14. In such treatment process a relatively small dosage of the treatment solution is added to the hydrocarbon based liquids or aqueous solutions being treated, e.g., at a standard dosage rate of 0.25-6.0 ml of the treatment solution/liter of the liquid being treated, preferably 1.0-5.0 ml of the treatment solution/liter of the liquid being treated, which corresponds to approximately 125-3000 ppm of hydroxide(s) in the liquid being treated. A particularly appropriate dosage rate depends on multiple factors, and the hydroxide(s) in the solution efficiently remediate the $H_2S$ and other sulfur-containing compounds down to acceptable levels within relatively short time periods such as 15 minutes to a few hours, and without otherwise detrimentally affecting the hydrocarbon—petroleum based liquids or contaminated aqueous solutions in any significant manner.

Very significantly, this previously proposed treatment process including the treatment composition is not reversible in relation to $H_2S$ and the other contaminants that are remediated, unlike previously known $H_2S$ scavenging compositions involving triazine or formaldehyde and processes using the scavenging compositions for remediating $H_2S$ and other contaminants in liquids including crude oil. Also, very significantly, the standard dosage of the treatment composition discussed above is appropriate for remediating contaminated liquids, including crude oil, having a wide range of the amounts of contaminants contained therein, which is also very different from previously known $H_2S$ scavenging compositions involving triazine or formaldehyde which require more specific dosage rates based on the amount of $H_2S$ and other contaminants that are being scavenged. Thus, barring an anomalous liquid containing an exceptionally large content of contaminants it is typically not necessary to adjust the dosage amount based on the particular amount of contaminants contained in a liquid to be treated and the treatment process is not detrimentally affected if the amount of contaminants in the liquids being treated spikes at times during the process.

Another previous proposal by one of the present inventors, as disclosed in PCT/US2018/064015, involves use of an aqueous based treatment composition which is similar to the composition disclosed in PCT/US2018/050913 but additionally includes an appropriate amount of organic acid(s) such as fulvic acid and humic acid, which is added to the treated liquid at a dosage rate that will typically result in a concentration of the organic acid(s) in the liquid being treated being in a normal range of 0.01-10 ppm, preferably 0.1-3 ppm, whether the liquid is a hydrocarbon based liquid or contaminated aqueous solution. The organic acid(s) such as fulvic acid and humic acid are effective to bind to the remediated contaminants and maintain them in the treated liquids without forming any precipitates while the contaminated liquids are being treated, transported and/or stored for a period of time such as hours, days or weeks before the treated liquids are further processes at a refinery or the like. A small amount, e.g., less than 2 wt % of an anti-scaling agent such as monoethanolamine (MEA) may be in this treatment process/composition.

Fulvic acid is actually a family of organic acids, but may typically be identified as 1H,3H-Pyrano[4,3-b][1]benzopyran-9-carboxylic acid, 4,10-dihydro-3,7,8-trihydroxy-3-methyl-10-oxo-; 3,7,8-trihydroxy-3-methyl-10-oxo-1,4-dihydropyrano[4,3-b]chromene-9-carboxylic acid, with an average chemical formula of $C_{135}H_{182}O_{95}N_5S_2$ and molecular weights typically in a range of 100 to 10,000 g/mol. Somewhat similarly, humic acid is a mixture of several molecules, some of which are based on a motif of aromatic nuclei with phenolic and carboxylic substituents, linked together, and the illustration below shows a typical structure. Molecular weight (size) of humic acid is typically much larger than that of fulvic acid, and can vary from 50,000 to more than 500,000 g/mol.

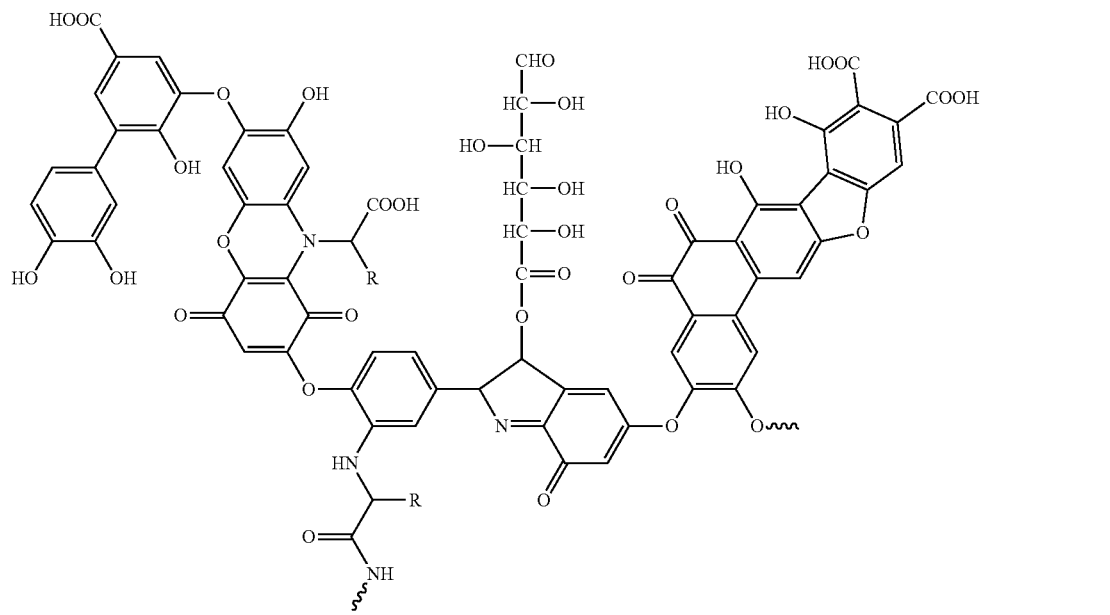

The treatment composition and process according to this previous proposal involves a standard dosage of the treatment composition generally corresponding to the standard dosage of the first previous proposal discussed above. This previously proposed treatment composition and process are also advantageously not reversible, and the standard dosage of the treatment composition discussed above is appropriate for remediating contaminated liquids, including crude oil, having a wide range of the amounts of contaminants contained therein.

While the previous proposals by one of the present inventors' for treating contaminated liquids are much more effective, as well as more cost efficient and practical, than the previously known treatment compositions and treatment processes, there is always a desire for improvement.

Treating contaminated gasses is generally far more challenging than treating contaminated liquids for multiple reasons. Although there are many known treatment compositions and treatment processes for treating contaminated gasses, in many instances the conventional treatment compositions and treatment processes are not sufficiently effective at remediating the contaminated gasses in a practical, cost effective manner. For example, there are many known natural gas deposits around the world which are heavily contaminated with $H_2S$, along with other significant contaminants including other species of sulfur-containing compounds, carbon dioxide ($CO_2$), ammonia ($NH_3$), water ($H_2O$), salts such as sodium chloride (NaCl), nitrogen ($N_2$), crude oil, various solid matters, including organic matter, etc., and these have proven to be most challenging. Using the conventionally known treatment compositions and treatment processes, it has not been possible to sufficiently remediate such highly contaminated natural gas in a practical, cost-effective manner to make the natural gas appropriate for sale or use. Correspondingly, many of the known gas deposits and existing natural gas wells are not being used, but remain un-tapped or capped.

Relative to treating contaminated gasses including natural gas, one of the present inventors has previously proposed treatment compositions and treatment processes for such purpose in U.S. Pat. No. 10,913,911 B2 (the '911 patent) and U.S. Pat. No. 11,549,064 (the '064 patent), the contents of which are both incorporated herein by reference. The '911 patent discusses multiple reasons why treating contaminated gasses is much more complicated than treating contaminated liquids such as crude oil and contaminated aqueous solutions, even when the primary contaminant for remediation in the gases is $H_2S$ just as $H_2S$ is the primary contaminant for remediation in crude oil. The reasons primarily include a few significant complications associated with treating large volumes of contaminated natural gas on a continuous basis, whereby the treatment compositions and processes used for treating contaminated liquids cannot be directly applied for treating contaminated gasses. For example, contaminated gasses such as natural gas often contain significant amounts of other contaminants in addition to $H_2S$, e.g., carbon dioxide ($CO_2$), nitrogen ($N_2$), water ($H_2O$), sodium chloride (NaCl), etc. which can cause great inefficiencies in gas treatment processes, including that some of the contaminants such as salts may tend to precipitate from the contaminated natural gas when it is treated, which can readily clog up parts of the treatment system and otherwise detrimentally affect the treatment process, leading to significant expense and inefficiency. Further, the nature of contaminated gasses including natural gas is much different from the nature of crude oil and other liquids, including that the value of a contaminated gas such as natural gas on volume basis is much less than crude oil, e.g., natural gas is typically, continuously discharged from a well at significant velocities, pressures and volumes of up to millions of cubic feet per day per well, and the contaminated gasses must be handled and processed much differently than liquids and this creates other complications for treating these contaminated gasses. For example, a treatment process for remediating a contaminated gas such as natural gas may only permit contact between the treatment composition and the contaminated gas for a few seconds or less, unlike treatment of contaminated liquids which may simply involve adding appropriate amounts of treatment composition to the contaminated liquids and then allowing the liquids mix and react together for an appropriate time until the $H_2S$ and other contaminant(s) in the liquid are remediated down to safe, acceptable levels.

As discussed in the '911 and '064 patents, an aqueous based treatment composition such as those disclosed in PCT/US2018/050913 and PCT/US2018/064015 and the '911 and '064 patents may be used for remediating $H_2S$, $CO_2$ and other problematic contaminants in gasses down to safe levels, but it may be necessary to initially treat the natural gas to remove other contaminants including salts and water, so that remediation of the $H_2S$, $CO_2$ and other problematic contaminants may be conducted continuously and efficiently. A treatment composition as disclosed in the '911 and '064 patents according to the inventor's previous proposal is aqueous based and similar to that disclosed in PCT/US2018/064015. It includes a high hydroxide concentration for remediating the $H_2S$, $CO_2$, etc. as well as a smaller amount of organic acid(s) such as fulvic acid and humic acid to prevent formation and release of precipitates from the treated gas, and may further include a chelating agent such as ethylenediaminetetraacetic acid (EDTA), which among other things increases the efficiency of hydroxide compounds in remediating $H_2S$ and other contaminants and helps to make the remediation of $H_2S$ irreversible, a surfactant such as sodium lauryl sulphate and a buffering agent such as potassium carbonate, etc. A quantity of such treatment composition may be disposed in a reaction chamber or tower and the natural gas may be bubbled through the treatment composition whereby $H_2S$, $CO_2$ and some other contaminants in the natural gas will be remediated while causing little or no precipitates to form and be released from the treated gas. Prior to such remediation step, however, the treatment process may require additional, preliminary treatment steps and equipment for removing water, salts, etc. from the natural gas before the gas is reacted with the treatment composition. Salts are likely to precipitate out of the treated gas if the salts are present when the gas is reacted with the treatment composition and the salt precipitates tend to cause clogging and other problems that would make this part of the treatment process inefficient if they are present. Water in the natural gas will typically have salts dissolved therein, and will tend to undesirably dilute the treatment composition.

The inventor's previously proposed treatment compositions and processes for remediating contaminants in gasses have proven to be much more practical and cost effective at sufficiently remediating the $H_2S$ and other contaminants in gasses such as natural gas in comparison to previously known treatment compositions and treatment processes. Like the inventor's proposals for remediating $H_2S$ and other contaminants in liquids, these treatment compositions and processes for remediating contaminants in gasses remediate the $H_2S$ and other contaminants in the gasses non-reversibly and a standard dosage of the treatment composition is advantageously effective for remediating the contaminants over a wide range of contents. However, the previously proposed treatment solutions and treatment processes for remediating contaminated gasses still remain to be improved on. For contaminated gasses and mixtures of contaminated fluids including gasses, it still remains a great challenge in the art for remediating $H_2S$, $CO_2$, and other contaminants therein down to appropriate, safe levels in a practical, cost effective manner.

SUMMARY OF THE INVENTION

The present inventors have further studied the treatment of contaminated fluids, including liquids, gasses and mixtures of these, and have discovered new treatment solutions/compositions and treatment processes which may be used for remediating contaminated gasses, and which are very effective, efficient and economically practical for remediating and/or removing essentially all types of contaminants, including hydrogen sulfide $H_2S$, carbon dioxide ($CO_2$), ammonia ($NH_3$), water ($H_2O$), salts such as sodium chloride (NaCl), nitrogen ($N_2$), etc. as contained in contaminated gasses down to significantly reduced levels in a very efficient and cost effective manner.

A first discovery made by the present inventors pertains to treatment of contaminated gasses. Such gasses include, natural gas from a well which may contain significant amounts of salts, $CO_2$, $H_2S$, $NH_3$, $SO_2$, other sulfur based contaminants including mercaptans and thiophenes, and metals, natural gas which has been partly treated according to the inventors' first discovery discussed herein, combustion gasses from fossil fuels from various industries including power producing plants which typically have high concentrations of $CO_2$ and $SO_2$, gas streams including water vapor with salts and metals therein, etc. Specifically, the inventors have discovered that a unique water wash according to the present invention may be very effectively and efficiently used as a treatment or pre-treatment process for significantly reducing the amounts of various contaminants in the contaminated gasses, so that the treated gasses may be directly used, or further handled and/or treated depending on specific requirements.

The inventors have determined that if water used in a water wash, through which contaminated gasses are to be bubbled or otherwise contacted by for treatment, is modified to be alkaline with an elevated pH above 8, and preferably in a range from above 8 to about 11, by addition of one or more alkaline substances including hydroxide compounds, such an alkaline water wash is surprisingly extremely effective at removing most of the contaminants from the contaminated gasses in a relatively simple treatment process whereby the gasses are bubbled or otherwise passed through the alkaline water wash with a relatively short contact time, e.g., in a range of 0.5-10 seconds. The water wash solution may include about 15-25 wt % collectively of one or more hydroxide compound(s) for raising the pH of the solution to 11, but the specific weight % will depend on the particular hydroxide compound(s) used and desired results. The inventors have experimented with such a treatment process using the alkaline water wash according to the discovery and found that it is surprisingly, very effective at removing and/or remediating most of the salts, $CO_2$, $H_2S$, $SO_2$, other sulfur based contaminants including mercaptans and thiophenes, and metals from the contaminated gasses, and if the alkaline water wash solution is regularly replaced or refortified to maintain its potency/effectiveness, it can be efficiently used to remove and/or remediate most of the contaminants from various contaminated gas streams, including highly contaminated gas streams, in a practical, cost effective manner.

Water is generally effective for removing salts from contaminates gasses because the salts are very soluble in water and easily pass from the gasses to the water when the gasses contact the water in the water wash. Potable and non-potable water may be used in the water wash, although potable water is preferred because the water used should initially have a low salt content so that it may take in more salts from the contaminated gasses before the water becomes saturated with salts, leading to greater efficiency. However, the inventors have discovered that if the water of the water wash is made alkaline with a pH above 8 by the addition of alkaline substances such as hydroxide compounds, then the water wash becomes surprisingly very effective at removing essentially all of the salts from the gasses. As the pH of the water wash solution is increased above 10 it also becomes very effective at removing and/or remediating significant amounts of $H_2S$ and other sulfur based contaminants $CO_2$, metals, and essentially all other contaminants from the gasses. For example, the inventors have discovered that if the pH of the water wash is increased to a level of around 11 by the addition of alkaline substances such as hydroxide compound(s), if a gas highly contaminated with $H_2S$, $SO_2$, $CO_2$, salts, etc. is passed through the alkaline water wash with an appropriate contact time of at least 0.5-10.0 seconds, and preferably at least 1.0 second: 1) essentially all of the salts pass from the gas into the water wash and precipitate out of the alkaline water wash; 2) much of the sulfur based contaminants in the gas, including $H_2S$, $SO_2$, mercaptans and thiophenes, are remediated by reacting with the alkaline substances such as hydroxide compound(s) added to the water wash and then precipitate out of the gas and/or the water wash as elemental sulfur and/or sulfur compounds generated by such remediation reactions; 3) much of the carbon based contaminants in the gas, including $CO_2$ and CO, are remediated by reacting with the alkaline substances such as hydroxide compound(s) added to the water wash and then precipitate out of the gas/alkaline water wash, e.g., as carbonate crystals; and 4) much of the metal contaminants in the gas also react with the alkaline substances such as hydroxide compound(s) added to the water wash and may then precipitate out of the gas/alkaline water wash. If the content of each of $H_2S$ and $CO_2$ in the gas is approximately 30,000 ppm before the water wash, after passing through the alkaline water wash the content of each of these may be reduced to be in a range of approximately 10,000 ppm or less. The alkaline water wash solution is also effective at killing any bacteria which may be included in the contaminated gasses based on the high pH, although it is certainly possible to also add an anti-bacterial agent to the water wash. Some known anti-bacterial agents include silicates such as potassium silicate ($K_2SiO_3$), copper sulfate ($CuSO_4$), barium, etc. Generally, there may be a significant amount of precipitates of solids that are released from water wash solution as sufficient amounts of contaminated gasses are bubbled through or otherwise contacted with the water wash solution and contaminants in the gasses are remediated. Also, contact time between the contaminated gasses and the water wash solution may be controlled based on volume and pressure of the contaminated gasses being passed through the water wash solution, the size of the reaction chamber and amount of water wash solution contained therein, means provided in the reaction chamber for disrupting flow of the contaminated gasses through the water wash solution, etc.

The pH of the water wash in the new invention could be increased above 11 by addition of greater amounts of alkaline substances such as hydroxide compounds and such alkaline water wash solution would still be encompassed by the present invention as it would also be very effective at removing most of the contaminants from the contaminated gasses consistent with an object of the present invention. However, as a practical matter in terms of cost, it takes proportionally much more of such substances to increase the pH above 11 than it takes to increase the pH of the water from around 7 up to 11, so that having an upper limit of around 11 for the pH makes the treatment process more efficient. On the other hand, the alkaline water wash solution becomes less and less effective at remediating and removing contaminants from gasses the more it is used, which is reflected by a reduction in pH, and the alkaline water wash may need to be refreshed with some new treatment solution or changed regularly to maintain its effectiveness at remediating and removing contaminants from gasses. For example, the inventors have determined through testing that the alkaline water wash becomes less and less effective at remediating contaminants in the gases and/or causing them to precipitate from the gas/water wash when the pH of the water wash drops below 10, e.g., when the pH of the alkaline water wash drops to about 9.5 some of the $H_2S$ and $CO_2$ will begin to pass through, when the pH drops below 9 the alkaline water wash's ability to remediate and remove contaminants from gasses is significantly reduced from its original ability at a pH of 10 or above, and at a pH of about 8 the alkaline water wash's ability to further remediate and remove contaminants from gasses is essentially spent, even if the various precipitates being released from the treated gas and the water wash are removed on a continuous or somewhat continuous basis. Thus, the alkaline water wash solution could be most effective at removing and/or remediating contaminants from contaminated gasses, possibly close to 100% effective, if the solution is refreshed or replaced whenever its pH drops to a value below 10, but this may not be the most practical, cost effective process of using the water wash solution for removing contaminants as there is still a significant amount of reactants in the alkaline water wash solution when the pH drops below 10. The inventors have found that one practical, cost efficient process of using the alkaline water wash solution is to initially increase the pH up to about 11 by the additional of alkaline substances such as one or more hydroxide compounds, use such solution to remove contaminants from a flow of the contaminated gas until the solution's pH drops below 10 or even to between 9 and 8, and then either refresh or replace the solution with fresh solution having a pH of about 11, while repeating these steps as often as necessary.

A second discovery by the present inventors is that the water wash solution may be further modified by the addition of an appropriate amount of organic acid(s) such as fulvic acid and humic acid, for the purpose of controlling or limiting the amount of solids generated in or released into the water wash as the water wash is used to remediate contaminated gasses which are bubbled or otherwise passed therethrough so that little or none of such solids precipitate out of the water wash solution, even when the pH of water wash solution is 10 and above. The organic acids may for example be added to the water wash solution at a dosage rate in range of 0.005 to 3.0 weight % to achieve a pH of about 11 from an initial pH of about 7 which is normal for water. Without limiting the invention, the inventors believe that organic acid(s) such as fulvic acid and humic acid are effective because they bind to the remediated contaminants and maintain them dissolved and/or suspended in the water wash solution so as to minimize formation any solids that precipitate out of the water wash while the contaminated gasses are being bubbled or passed through the water wash solution. Although there may be some solids that are generated in and/or released into the water wash solution, the amount of such solids is limited so that they mostly remain in the water wash solution and do not form solid precipitates that are released from the water wash solution and, therefore, will not accumulate within a treatment system in which the treatment process is carried out and will not create problems such as partial and complete blockage of pipes and the like that would have to be resolved.

Further, the inventors have determined that a treatment process for contaminated gasses involving the water wash solution having an elevated pH and an appropriate amount of organic acid(s) such as fulvic acid and humic acid can be operated on a continuous or substantially continuous basis provided that the water wash solution is regularly refreshed when the pH of the water wash solution drops below about 10 by withdrawing some amount or portion of the water wash solution which has already been used to treat some contaminated gas and will correspondingly have a reduced pH and may perhaps have some amount of suspended solids therein, and replacing the withdrawn solution with an equal amount of fresh water wash solution having a pH of around 11. By controlling or limiting the amount of solids generated in or released into the water wash with the addition of one or more of these organic acids and regular refreshing of the water wash solution, and thereby preventing release of precipitates from the water wash solution, it becomes possible to continuously remediate the contaminated gasses using the water wash solution in a treatment process according to the present invention for as long as desired, essentially indefinitely, which makes the treatment process even more cost effective and efficient. For treating contaminated natural gas from a well or a number of wells that are linked together, it is very desirable to be able to operate the treatment process on a continuous basis because the wells are typically operated continuously.

Generally, all hydroxide compounds may be used provided they can be dissolved or dispersed in the water wash solution. However, some hydroxide compounds have lower cost, e.g., NaOH and KOH, and if used may make the composition and treatment processes using the novel water wash according to the present invention more economically advantageous. Also, if the novel water wash according to the present invention is to be used with contaminated gasses such as natural gas which include significant amounts of NaCl salt, which will typically be dissolved in any water included in the contaminated gasses, it may be desirable to use hydroxide compound(s) other than NaOH in the water wash solution. This will increase the efficiency of the treatment process because such water wash solution will be able to uptake more NaCl from the contaminated gasses before the solution becomes saturated with NaCl, and may help prevent causing any salt to precipitate out of the water wash solution.

The water wash solutions according to the present invention may also include amounts of other chemical compounds besides hydroxide compounds to increase alkalinity, organic acid(s) such as fulvic acid and humic acid to prevent release of precipitates and ant-bacterial agent(s). This may depend on the specific characteristics of the contaminated gasses being treated and desired results. For example, the new water wash solutions may include 0.5 to 20 volume %, of one or more organic liquids such as alcohols, hexane, toluene, xylene, etc. having a vapor pressure higher than that of water.

Such organic liquids are helpful to increase vapor pressure of the water wash solution such that some amount of the hydroxide compound(s) in the water wash solution will be in the vapors of the organic liquid(s) that remain in the gases that have been remediated after passing through the novel water wash according to the present invention, e.g., in a headspace above the water wash solution in a reaction chamber in which the water wash solution is disposed, and whereby the hydroxide compound(s) may continue to react with and remediate any residual $H_2S$ and/or other contaminants remaining in the remediated gasses.

A third discovery by the present inventors is a new treatment process and system for treating contaminated gasses such as those discussed herein, including natural gas from wells, which is a hybrid between modified water wash process according to the first discovery discussed above and a continuous treatment process in which the contaminated gas is contacted with a treatment composition with a very high concentration of hydroxide from one or more hydroxide compounds such as the treatment compositions disclosed in PCT/US2018/050913 and PCT/US2018/064015 and the '911 and '064 patents and variations thereof, rather than with the modified water wash process according to the first discovery.

The new treatment process according to the third discovery may be used to treat contaminated gas and involves steps of: flowing a stream of the contaminated gas through a pipeline; treating the flowing stream of the contaminated gas by injecting droplets of a liquid treatment composition containing 35-55 wt % total of one or more hydroxide compounds into the flowing the stream of the contaminated gas in the pipeline such that the liquid treatment composition mixes into the contaminated gas in the flowing stream and remediates contaminants in the contaminated gas; injecting water into the mixed flowing the stream of the contaminated gas and the liquid treatment composition in the pipeline downstream of where the liquid treatment composition is injected into the pipeline; and then separating the flowing stream of the treated contaminated gas from any remaining amount of the liquid treatment composition, the water and the precipitates in a separator.

The treatment process may be operated on a continuous basis amount of liquid treatment composition that is injected into the flowing stream of the contaminated gas in the pipeline is based on the amount of the contaminated gas being treated and the types and amounts of contaminants in the contaminated gas. Any volume of contaminated gas may be treated, but for natural gas from one or more wells that are typically collected together in a given location, a typical daily output of the contaminated natural gas may be from 500,000 $ft^3$ to 5,000,000 $ft^3$, and the contaminants may include salts, $CO_2$, $H_2S$, $SO_2$, other sulfur based contaminants including mercaptans and thiophenes, and metals in varying amounts. Technically water may also be considered a contaminant in a gas, but in this disclosure water is not intended to be considered as one of the contaminants that are being remediated. For treating such volumes of contaminated natural gas, the inventors have determined that an appropriate amount of a treatment composition, such as those disclosed in PCT/US2018/050913 and PCT/US2018/064015 and the '911 and '064 patents and variations thereof, is in a range of one 1 to 150 US gallons/hour. Such amounts of the treatment compositions would also be applicable for similar volumes of other contaminated gasses. The amount of water injected downstream in the pipeline of where the treatment composition is injected may be the same or substantially the same as the amount of treatment composition injected, but can be significantly greater if necessary to flush any precipitates and solids rereleased from the contaminated gas in the treatment step into the separator. There is generally no downside to using excess water as the cost is relatively small. It is important that the precipitates and solids released in the treatment step not build up in the pipeline. The most appropriate amounts of the treatment composition can be determined by monitoring pH, pKa and/or other characteristics of the treated contaminated gas and/or the liquids in the separator, and appropriate adjustments may be made to the treatment system and/or process based on the monitored characteristic(s). Such adjustments may include: adjusting the amount of treatment composition being injected in the treatment step; adjusting the amount of water being injected, adjusting the position(s) of the pipeline where the treatment composition and/or the water are injected, adjusting a distance between the positions where the treatment composition and water are injected, etc.

A distance between where the treatment composition is injected in the treatment step and where the water is injected in the pipeline may be based on how fast the contaminated gas is flowing in the pipeline, as the inventors have determined that there should be at least 0.2 seconds, and preferably at least 0.5 seconds, of contact between the contaminated gas and the treatment composition before the water is injected for purposes of efficiency. The inventors have determined that this amount of contact is sufficient for the treatment compositions to sufficiently remediate a large amount, e.g., 40 to 80 wt % of the contaminants in the contaminated gasses while substantially depleting most of the reactiveness of the treatment composition. Thus, if the contaminated gas is flowing at 3-10 ft/second, the distance between the positions where the treatment composition and the water are injected into the pipeline may be 0.6 to 3.0 feet. Once the water is injected into the pipeline downstream of where the treatment composition was injected, the water will dilute any remaining amount of the treatment composition so that the treatment composition may continue to remediate the remaining contaminants but less quickly and efficiently. The injected water provides an important function of preventing or minimizing any accumulation of precipitates and solids that may be released from the contaminated gas once it is treated with the treatment composition, which is important for efficient, continuous operation of the treatment system and treatment process. The precipitates and solids may include salt, carbonate crystals, sulfur, sulfur contain compounds, metals, etc., and the precipitates will typically flow along with the injected water and the liquid treatment composition, into the separator where the treated contaminated gas is separated from the these liquids and the precipitates. Distance between where the water is injected into the pipeline and the separator can vary, it is generally desirable to separate the treated contaminated gas from the liquids and precipitates quickly after the water is injected, so that the distance from the position of the pipeline and where the water is injected and the position of the separator may, for example, be as little as 1 to 25 feet. The separated liquids and precipitates may be disposed of or collected and further processed if desired.

Such new treatment process may further include: a second treatment step in which an additional amount of the treatment composition is injected into a flowing stream of the treated contaminated gas in the pipeline after the separation step; and second separating step in which the flowing stream of the treated contaminated gas is separated from any remaining amount of the liquid treatment composition and any further precipitates released from the treated contaminated gas in a second separator. The amount of the treatment composition added in the second treatment step may be significantly less than the amount of the treatment composition added in the first treatment step, e.g. ≤⅕ of the amount in the first treatment step for the same amount of the gas because most of the contaminants are remediated/removed from the contaminated gas in the first treatment step. The treatment process may also include a second water injection step in which water is injected into the treated contaminated gas in the pipeline downstream of where the additional amount of the treatment composition is injected into the pipeline in the second treatment step. However, because there will be much less precipitates released from the twice treated contaminated gas as a result of the second treatment step, the second water injection step may not be required to prevent build up of the precipitates in the pipeline. Thus, the second water injection step is optional and may be omitted.

The treatment system and process according to the third discovery is very advantageous over conventionally known treatment systems and processes for treating contaminated gasses. With the new process the inventors have been able to successfully treat highly contaminated gasses, including natural gas, in a practical, cost effective manner in a continuous treatment process, where all of the conventionally known treatment systems and processes were unable to do so. For example, the inventors have run the new treatment system and process in relation to large volumes of highly contaminated natural gas, e.g., daily volumes of 500,000 ft$^3$ to 5,000,000 ft$^3$, containing large amounts of $H_2S$, $CO_2$, as well as other contaminants including salts, metals, other sulfur containing substances, etc., and have achieved 40 to almost 100% remediation of contaminants in an efficient, cost effective manner. Conversely, this same highly contaminated natural gas could not be treated in a practical, cost efficient manner using the conventionally known treatment systems and processes. The owners of the wells which output the highly contaminated natural gas were essentially forced to shut down these wells because of their inability to treat the highly contaminated natural in a practical, cost efficient manner, whereby the owners also could not extract the crude oil which would be output by the same wells together with the highly contaminated natural gas. The new treatment system and process allows these shut down wells to be operated.

Further, the treatment system and process according to the third discovery is quite flexible in terms of the extent to which contaminants in the highly contaminated gasses, including natural gas, is remediated using the new system and process. For example, in their treatment of the highly contaminated natural gas, the present inventors are able to adjust the system and process to achieve different levels of remediation, which may be desired in any given situation. For contaminated natural gas, it is often sufficient to reduce the levels of contaminants, particularly $H_2S$, by 40-80 wt % or volume % in order for the contaminated gas to be accepted by a refiner, which will further remediate the contaminants as necessary or desired. Although such partially remediated natural gas may still be considered as "sour", it can be extracted from the wells and sold for direct use or further refining, while the ability to extract the natural gas also permits crude oil to be extracted from the wells. Further, it is possible to achieve about 100% remediation of the contaminants in the highly contaminated natural gas if the first and second treatment and separation steps are used.

Thus, the level of remediation achieved by the treatment system and process can be easily adjusted depending on customer demands and desires.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Figure 1:
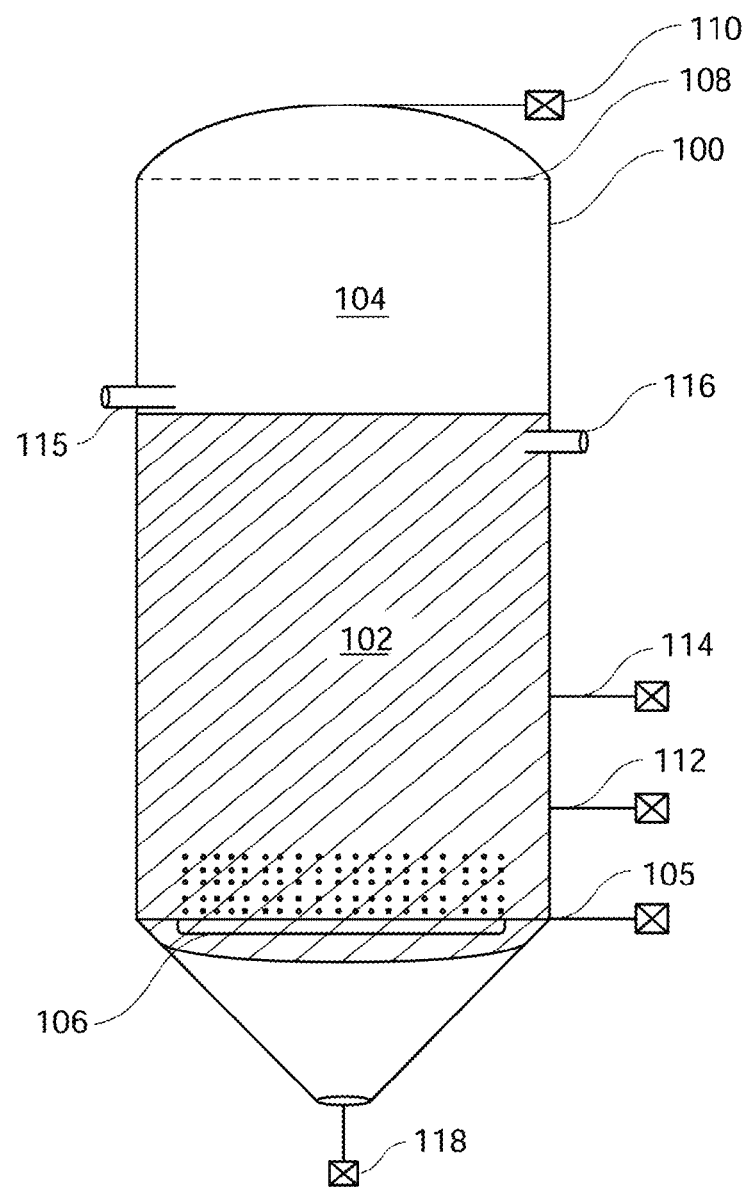
FIG. 1 is a schematic diagram of a water wash type reaction chamber which may be used in a treatment process for remediating the contaminants in a contaminated gas according to an exemplary embodiment of the present invention.

A first aspect and embodiment of the present invention pertains to a novel treatment system and process for efficiently and cost effectively removing most of essentially all contaminants that are often present in contaminated gasses. The contaminated gasses may be natural gas from a well, combustion gasses from fossil fuels, methane gas from a landfill, etc. The contaminated gasses may contain significant amounts of salts, $CO_2$, $H_2S$, other sulfur based contaminants including mercaptans and thiophenes, metals, $SO_2$, $NH_3$, etc., no matter what amounts of contaminants are in the gasses. This treatment process is based on the inventors' discovery that if a water wash is modified to be alkaline with an elevated pH above 8, and preferably in a range from above 8 to about 11, by addition of one or more alkaline substances including hydroxide compounds, such an alkaline water wash is a surprisingly, extremely effective treatment composition for removing most of essentially all contaminants from the contaminated gasses when the gasses are bubbled or otherwise passed through the alkaline water wash with a contact time in a range of 0.2-5.0 seconds, preferably at least 1.0 seconds. Based on substantial experimentation, the inventors have determined such a treatment process using the alkaline water wash according to the exemplary embodiment and found that it is surprisingly, extremely effective at removing most of the salts, $CO_2$, $H_2S$, other sulfur based contaminants including mercaptans and thiophenes, $SO_2$, $NH_3$, and metals from the contaminated gasses, and if the alkaline water wash solution is regularly replaced or refortified to maintain its potency/effectiveness, it can be efficiently used to remove most of the contaminants from various contaminated gas streams, including highly contaminated gas streams, in a practical, cost effective manner.

Various alkaline substances may be added to the water wash to increase its pH to a desired value of about 11. These include one or more hydroxide compound(s). Essentially any hydroxide compound may be used, but some appropriate hydroxide compounds include potassium hydroxide (KOH), sodium hydroxide (NaOH), ammonium hydroxide ($NH_4OH$), lithium hydroxide (LiOH), magnesium hydroxide ($Mg(OH)_2$), and manganese hydroxide ($Mn(OH)_2$, $Mn(OH)_4$) etc. all of which are readily soluble in water. The water wash solution may include about 15-25 wt % collectively of one or more hydroxide compound(s) for raising the pH of the solution from the pH of the water which is typically around 7 up to about 11, but the specific amount or weight % of hydroxide compound(s) needed to achieve this will depend on the particular hydroxide compound(s) used and desired results. Thus, for example, if KOH is added to the water wash for increasing the pH of water from about 7 up to about 11, the inventors have found that this may be achieved by combining an amount of a concentrated (45 wt %) aqueous solution of KOH with an amount of water at a ratio of about 1:1 to 1:2, or by adding appropriate amounts KOH powder or KOH hydrate flakes to the water. NaOH may also be used as one of the hydroxide compounds in the water wash, but may not be the most efficient hydroxide compound to use if the contaminated gasses to be treated contain significant amounts of salts. Given that Na is also a main component of the common salt NaCl, use of NaOH as one of the hydroxide compounds in the water wash solution would reduce the amount of salt that may be taken in by the water wash solution from the contaminated gasses before the water wash solution becomes saturated with salt. Once the water wash solution is saturated with salts, any further amounts of salts taken in by the water wash solution are likely to be released as solids from the water wash solution. NaOH is desirably lower in cost than other hydroxide compounds, and may be a suitable hydroxide compound for use in many applications of the system and process according to the exemplary embodiments of the present invention. $NH_4OH$ is an appropriate hydroxide compound for increasing the water wash pH, but may not be the only compound used for such purpose because it may release ammonia ($NH_3$) into the gas being treated, whereas there are governmental limits on the amounts of $NH_3$ contained in gasses, e.g., natural gas should contain no more than 14 ppm of $NH_3$. Thus, for example, appropriate amount(s) of other hydroxide compounds such as KOH, NaOH or LiOH could be used together with $NH_4OH$ for increasing the pH of the water wash. $NH_4OH$ not only functions effectively in the alkaline water wash solution as gas is bubbled through the solution, but also favorably increases the vapor pressure of the alkaline water wash so that some hydroxide will go into vapor form in the head space above the water wash solution and any contaminants remaining in the treated gas after it passes through the water wash may be further remediated by hydroxide vapors in the head space above the water wash in a reactor.

In addition to hydroxide compounds, other substances which may be added to the water wash to improve its effectiveness and/or stability at removing contaminants from gasses include smaller amounts, e.g., less than 1% by volume, of a surfactant such as sodium lauryl sulfate or commercially available anionic polymers, a buffering agent such as phosphoric acid ($H_3PO_4$), an antibacterial compound such as potassium silicate ($K_2SiO_3$), copper sulfate ($CuSO_4$), chlorine, etc.

Water is generally effective for removing salts from contaminates gasses because the salts are very soluble in water and easily pass from the gasses to the water when the gasses contact the water in the water wash. However, the inventors have discovered that if the water of the water wash is made alkaline with a pH above 8 by the addition of alkaline substances such as hydroxide compounds, then the water wash becomes surprisingly, much more effective at removing essentially all of the salts from the gasses, and also becomes very effective at removing significant amounts of $H_2S$ and other sulfur based contaminants $CO_2$, and metals from the gasses. For example, the inventors have discovered that if the pH of the water wash is increased to a level of around 11 by the addition of alkaline substances such as hydroxide compound(s), and a gas highly contaminated with $H_2S$, $CO_2$, $SO_2$, salts, etc. is passed through the alkaline water wash solution with an appropriate contact time in a range of 0.2-5 seconds, and preferably at least 1.0 second: 1) essentially all of the salts pass from the gas into the water wash and/or precipitate out of the water wash; 2) much of the sulfur based contaminants in the gas, including $H_2S$, $SO_2$, mercaptans and thiophenes, are remediated by reacting with the alkaline substances such as hydroxide compound(s) added to the water wash and then precipitate out of the gas and/or the water wash as elemental sulfur and/or sulfur compounds generated by such remediation reactions; 3) much of the carbon based contaminants in the gas, including $CO_2$ and CO, are remediated by reacting with the alkaline substances such as hydroxide compound(s) added to the water wash and then precipitate out of the gas/alkaline water wash, e.g., as carbonate crystals; and 4) much of the metal contaminants in the gas also react with the alkaline substances such as hydroxide compound(s) added to the water wash and then precipitate out of the gas/alkaline water wash, e.g., as metal sulfides. It is desirable that the salts be removed from the contaminated gasses because the salts are more likely to be released from the gasses as they are transported along a pipeline or other components of the treatment system, and may cause significant blockage of the pipelines and other system components. If the content of each of $H_2S$, $SO_2$ and $CO_2$ in the gas are 30,000 ppm or more before the water wash, after passing through the alkaline water wash the content of each of these may, for example, be reduced to be in a range of approximately 10,000 ppm or less. Note that contaminants including $H_2S$, $SO_2$ and $CO_2$ may be present at 60,000 ppm, 100,000 ppm, and several hundred ppm in the contaminated gasses.

Salts are removed from the gasses when they pass through the alkaline water wash because salts are very soluble in the alkaline water wash, and once the water wash is saturated with the salts they will typically precipitate out of the water wash as salt crystals, and will very likely precipitate out of the modified water wash solution having increased pH according to the present invention, especially as the pH is increased above 10 and if no other component is added to the water to prevent or limit the formation and release of precipitates.

It is desirable to use potable water in the water wash solution according to the present invention. Potable water may have some bacteria killing agent such as chlorine therein, but has little or no salt(s) therein so that the water may be able to receive as much salt as possible before the water wash solution becomes saturated with salts. However, if potable water is not available at any given location where it is desired to treat contaminated gasses using the novel water wash solution and treatment process according to the present invention, it is appropriate to use available water from other local sources which is itself not contaminated to any significant extent, such as surface water. Regardless of the water used, it may be desirable to add some type of anti bacterial agent to the water. For example, some source of chlorine other than NaCl could be added or another antibacterial agent such as copper sulfate ($CuSO_4$) could be added in appropriate dosages. Chlorine and copper sulfate are commonly used as antibacterial agents in potable drinking water and could be added in similar dosages to that used for drinking water.

Apart from removal of salts, there are several reactions between the hydroxide compound(s) in the alkaline water wash and the various contaminants in the gasses which cause the other contaminants to be remediated and/or removed as the gasses pass through the water wash, including reactions with $H_2S$, $CO_2$, metals including Fe, Al, Cr, V, etc. In low redox conditions under which natural gas is formed and a pH range of 8-11 of the alkaline water wash, metal hydroxides and metal sulfides are favored and will precipitate out until or unless there is substantial carbonate absorbed from any $CO_2$ in the contaminated gasses, after which metal carbonates may precipitate out. If KOH is used for increasing the pH of the water wash, KOH will react with $H_2S$ and remediate it to form potassium sulfide ($K_2S$) according to the following equation

$$KOH + H_2S \rightarrow K_2S + H2O \qquad (1)$$

$K_2S$ is highly soluble in water unlike metal sulfides. If metals, e.g., Fe, Al, V, etc., are present in the contaminated gasses metal sulfides including these metals will also precipitate out of the alkaline water wash. The speciation and solubility of metals is a function of pH, redox potential, carbonate content, and concentration of metals and salts. $CO_2$ may be removed from the contaminated gasses by contact with the alkaline water wash according to the following reactions which form bicarbonate crystals:

$$CO2 + OH^- \rightarrow HCO3^- \qquad (2),$$

$$K^+ + HCO_3^- \rightarrow KHCO_3 \qquad (3).$$

In test trials of the treatment process according to the exemplary embodiment of the present invention, as salt collected in the alkaline water wash and becomes briny, the briny water absorbs $CO_2$, then potassium bicarbonate ($KHCO_3$) crystallized out of the solution. Similar reactions occur if other hydroxide compounds besides KOH are used in the alkaline water wash.

While a desired upper range for the pH of the alkaline water wash according to the exemplary embodiment of the present invention is about 11, in fact, the pH of the water wash could be increased above 11 by addition of greater amounts of alkaline substances such as hydroxide compounds and such alkaline water wash solution would also be very effective at removing most of the contaminants from the contaminated gasses according to the treatment process of the present invention. However, as a practical matter in terms of cost, it takes proportionally much more of such alkaline substances to increase the water wash pH above 11 than it takes to increase the pH of the water from around 7 up to 11, so that an upper limit of about 11 is best for cost efficiency. On the other hand, the alkaline water wash solution becomes less and less effective at remediating and removing contaminants from gasses the more it is used, which is reflected by a reduction in the water wash's pH and pKa, whereby the alkaline water wash may need to be changed or refreshed regularly to maintain its effectiveness at remediating and removing contaminants from gasses. For example, the inventors have determined through significant testing that the alkaline water wash becomes less and less effective at remediating contaminants in the gases and/or causing them to precipitate from the gas/water wash for removal when the pH of the water wash drops below 10, e.g., when the pH of the alkaline water wash drops to about 9.5 some $H_2S$ and $CO_2$ will remain in the treated gasses, when the pH drops below 9 the alkaline water wash's ability to remediate and remove contaminants from gasses is significantly reduced from its original ability at a pH of 10 or above, and at a pH of about 8 the alkaline water wash's ability to further remediate and remove contaminants from gasses is essentially depleted or spent, even if the various precipitates being released from the treated gas and the water wash are removed on a continuous or somewhat continuous basis from the water wash. Thus, the alkaline water wash solution may be most effective at removing contaminants from contaminated gasses, possibly close to 100% effective, if the water wash solution is replaced whenever its pH drops to a value below 10. However, this may not be the most practical, cost effective process of using the water wash solution for removing contaminants, and cost is very important for practicality.

The inventors have found that a practical, cost efficient process of using the alkaline water wash solution to treat contaminated gasses such that much of the contaminants in the gasses are removed from the gasses and precipitated out of the water wash solution is to initially increase the pH up to about 11 by the additional of alkaline substances such as hydroxide compounds, then such solution may be used to remove contaminants from a flow of the contaminated gas until the solution's pH drops to between 9 and 8, and then replace the solution with fresh solution having a pH of about 11, while repeating these steps as often as necessary. As the precipitates are released from the water wash solution and settle at a bottom of a reaction chamber in which the water wash solution is disposed, the precipitates may be removed from the reaction chamber along with some amount of the used water wash solution and either disposed of or further processed if any of the precipitate have commercial value. The used water wash solution will generally include little or no $H_2S$, even if the contaminated gasses being treated contain significant amounts of $H_2S$, but may contain various amounts solids that are solublized in the used water wash solution. Such used water wash solution these may be safely disposed of, for example, by being pumped back into the earth through a well.

The water wash solution according to the discussed exemplary embodiment of the present invention may be modified by the addition of an appropriate amount of organic acid(s) such as fulvic acid and humic acid, for the purpose of controlling or limiting the amount of solids generated in or released into the water wash as the water wash is used to remediate contaminated gasses which are bubbled or otherwise passed therethrough, even when the pH of water wash solution is 10 and above. This can help prevent accumulation and build up of solids in the treatment system, including piping, and minimize downtime for removing the solids from the system. Further, the inventors have determined that a treatment process for contaminated gasses involving the water wash solution having an elevated pH and an appropriate amount of organic acid(s) such as fulvic acid and humic acid can be operated on a continuous or substantially continuous basis provided that the water wash solution is regularly refreshed and/or replaced when the pH of the water wash solution drops from an initial value of about 11 to a value below about 10. Such refreshing of the water wash solution may involve withdrawing some amount or portion of the water wash solution which has already been used to treat some contaminated gas and will correspondingly have a reduced pH and may perhaps have some amount of suspended solids therein, and replacing the withdrawn solution with an equal amount of fresh water wash solution having a pH of around 11 and an appropriate amount of organic acid(s) such as fulvic acid and humic acid.

Organic acids such as fulvic acid and humic acid may for example be added to the water wash solution at a dosage rate in range of 0.005 to 3.0 weight %. Without limiting the invention, the inventors believe that organic acid(s) such as fulvic acid and humic acid are effective because they bind to the remediated contaminants and maintain them in the water wash solution so as to minimize formation any solids that precipitate out of the water wash while the contaminated gasses are being bubbled or passed through the water wash solution. Although there may be some precipitates and solids that are generated in and/or released into the water wash solution, fulvic and humic acids help to limit the amounts of the precipitates and solids that are released from the water wash solution. Therefore, precipitates and other solids are less likely to accumulate within a treatment system in which the treatment process is carried out using the water wash solution containing an organic acid such as humuc acid and fulvic acid. Accumulation of the solids can create problems such as partial and complete blockage of pipes and the like that would have to be resolved, e.g., by shutting down the system and removing the accumulated precipitates. By controlling or limiting the amount of solids generated in or released into the water wash with the addition of one or more of these organic acids, it becomes easier to continuously remediate the contaminated gasses using the water wash solution in a treatment system and process according to the present invention for as long as desired, which makes the treatment system and process even more cost effective and efficient.

As one manner of controlling the treatment process in a continuous manner, the inventors have determined that if the pH of the fresh water wash solution is initially 11, which is an efficient starting pH as discussed herein, the pH may be monitored and whenever the pH drops below 10, at which point the water wash solution may contain some suspended solids and be cloudy, an amount of the used water wash solution may be withdrawn from the reactor containing the water wash solution and replaced with an equal amount of the fresh water wash solution with a pH of about 11 and containing an appropriate amount of organic acid(s) such as fulvic acid and humic acid as discussed herein. For example, the inventors have determined that withdrawing about 1/20 to 1/8 of the water wash solution from the reactor, e.g., at a bottom portion of the reactor, and replacing this with an equal amount of the fresh water solution, e.g., introduced at an upper or intermediate portion of the reactor, little or none of precipitates may accumulate in the reactor or in associated parts of the treatment system. Hence, no problems with be encountered due to clogging up the system, and the treatment process may be continuously run for long periods of time, e.g., weeks and months.

The water wash solutions according to the exemplary embodiments of the present invention may also include amounts of other chemical compounds depending on the specific characteristics of the contaminated gasses being treated and desired results. For example, the new water wash solutions may include 0.5 to 10 volume %, of one or more organic liquids such as alcohols, hexane, toluene, xylene, etc. having a vapor pressure higher than that of water. Somewhat like use of ammonium hydroxide as one of the hydroxide compounds, such organic liquids are helpful to increase vapor pressure of the water wash solution such that some amount of the hydroxide compound(s) in the water wash solution will be in the vapors of the organic liquid(s) that remain in the gases that have been remediated after passing through the novel water wash according to the present invention, e.g., in a headspace above the water wash solution in a reaction chamber in which the water wash solution is disposed, and whereby the hydroxide compound(s) in the treatment composition may continue to react with and remediate any residual $H_2S$ and/or other contaminants remaining in the remediated gasses.

With reference to the FIG. 1, depicted is a schematic diagram of a reactor or bubble tower 100 which may be used in a treatment process according to an exemplary embodiment of the present invention for removing and/or remediating most of the contaminants from contaminated gasses. The bubble tower 100 has a reaction chamber therein which may be partially filled with an amount of alkaline water wash solution 102 having a pH of about 11 while an upper portion of the reaction chamber defines a head space 104 above the solution 102. As a contaminated gas 105 is bubbled or otherwise passed through the alkaline water wash solution much of the contaminants therein will be removed and/or remediated as discussed above, and then the treated gas may pass through a baffle 108 or the like which can be provided in the head space 104 to help to remove some of the alkaline water wash solution which may remain in the gas, and finally the treated gas is discharged from the reaction chamber at an upper portion 110 thereof. Pre-mixed water wash solution may 102 be directly introduced into the reaction chamber or separate components of the water wash solution such as water and hydroxide compounds may be introduced into the reaction chamber through inlets 112, 114 to form the alkaline water wash solution. A level sensor 115 may be used to set and control the amount of solution 102 in the reaction chamber and sensor(s) 116 may be used to monitor pH and/or other characteristics of the solution 102. Contaminated gas 105 may be controlled to flow into a bottom portion of the reaction chamber based on Stokes Law for bubble formation and bubble rise with a desired liquid contact time through the water wash solution 102, e.g., 0.2 to 5.0 seconds and preferably at least 1.0 second. This may involve a discharge nozzle 106 having numerous small discharge openings defined therein, and may also involve a means (not shown) for disrupting the flow of the gas through the reaction chamber so that the gas cannot flow uninterrupted through the water wash solution in a stream or as large bubbles, and will thereby have much more surface area for reacting with the treatment composition. Such disrupting means may include packing the reaction chamber or portions thereof with a fine, non-reactive media (not shown), e.g., stainless steel wool, pea gravel, perforated plates, etc., through which the contaminated gas will pass as it flows through the water wash solution. The treatment system may be automated using a controller 120 such as a programmed ECU having an associated memory which stores program(s), predetermined thresholds and the like, sensed characteristics, etc. The controller may receive inputs from sensors 115, 116 and may control the flow of solution and gas into and from the reaction chamber by opening and closing various solenoid operated valves (not shown) associated with the respective various inlets and outlets of the reaction chamber.

The size of the reactor 100 may depend on the amount of contaminated gasses being treated and/or the amount of contaminants contained in the gasses that are to be remediated and removed via the alkaline water wash solution. For example, if a large continuous volume of contaminated gas is to be treated in the reaction chamber, such as natural gas output from a well at 500,000 to fifteen (15) million $ft^3$/day, the reactor may be four (4) feet in diameter and twenty (20) feet tall with a volume of 1880 US gallons, wherein the solution 102 may fill about 3% of the volume or about 1410 gallons. As another example, if a continuous flow of natural gas from a well is less than three (3) million $ft^3$/day then a reactor of 1000 US gallons or less may be used.

The treatment system may be automated using the controller 120 such as a programmed ECU having an associated memory which stores program(s), predetermined thresholds and the like, sensed parameters, etc. The controller may receive inputs from sensors 115, 116 and controls the flow of solution and gas into and from the reaction chamber by opening and closing various solenoid operated valves (not shown) associated with the respective inlets 105, 112, 114 and outlets 110, 118 of the reactor 100. The spent water wash solution and precipitates withdrawn through the discharge outlet 118 may be discarded in an appropriate manner, or depending on the economics of the situation some of the precipitates may recovered, processed and sold.

A treatment process involving the water wash solution according to the present invention may be operated in a batch mode or continuous mode. Further, the treatment process may be controlled to cause precipitates to be released or to restrict release of precipitates from the water wash solution. Whether precipitates and solids are released from the solution is largely dependent on the specific formulation of the water wash solution which is used in the bubble tower reactor, e.g., the pH of the water wash solution, and whether or not the water wash solution includes an amount of one or more organic acids such as fulvic acid and humic acid. Much of the contaminants in the contaminated gasses being treated will be removed and precipitate out of the water wash solution if it does not contain the organic acid(s), whereas some of the contaminants in the contaminated gasses being treated will be remediated and remain dissolved or suspended in the water wash solution if it contains such organic acid(s). For any formulation of the water wash solution, the treatment process using the water wash solution according to the present invention may be operated on a continuous or semi-continuous basis, which would be most efficient and practical for treating continuously flowing streams of contaminated gasses such as natural gas which is extracted from the earth through a single well or a battery of wells. Typical output of contaminated natural gas from the well(s) may be from 500,000 to fifteen (15) million $ft^3$/day.

Figure 2:
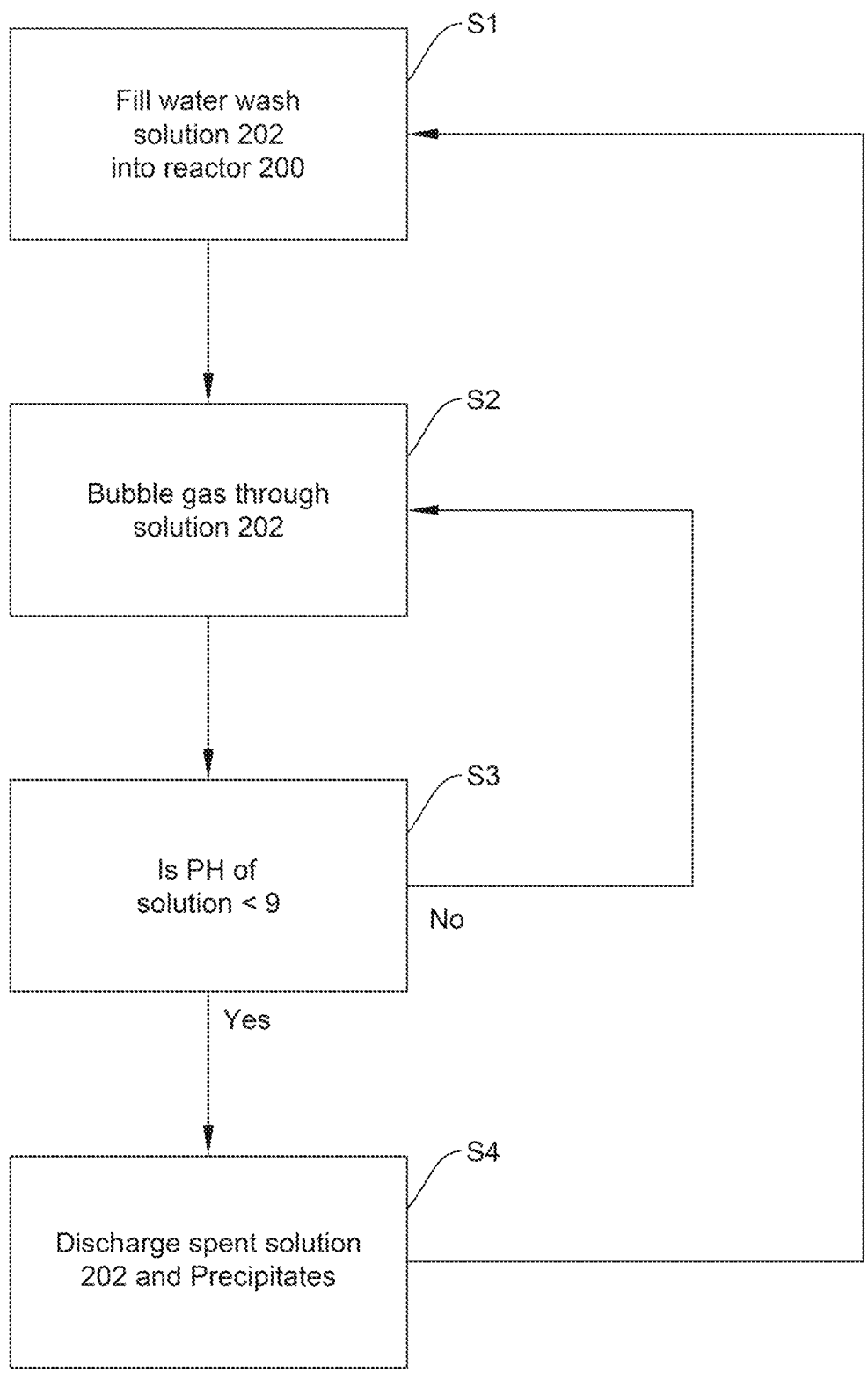
FIG. 2 is a flowchart of an exemplary embodiment of a batch type treatment process for remediating contaminated gasses according to of the present invention using the treatment reaction chamber of FIG. 1.

An exemplary embodiment of a batch type treatment process for removing contaminants from contaminated gasses which uses the treatment system shown FIG. 1 is shown in FIG. 2. In step S1, the reactor 100 is partially filled with the water wash solution 102 at an initial pH of about 11. Appropriate amounts of the pre-mixed water wash solution, or components of the water wash solution including water and hydroxide compounds, may be introduced into the reaction chamber through inlets 112, 114 partially filling the reaction chamber. The level sensor 115 may be used to set and control the level of solution 102 in the reaction chamber and the sensor 116 may be used to monitor pH, pKa and/or other characteristics of the solution 102. At step S2 a flow of contaminated gas 105 is introduced into the reaction chamber through the nozzle 106. As the contaminated gas passes up through the alkaline water wash solution much of the contaminants therein will be remediated or removed, e.g., some of the contaminants, including salts, will be released from the gas and the water wash solution and settle to the bottom of the reaction chamber, and some of the remediated contaminants will remain dissolved and/or suspended in the water wash solution, especially if the solution contains one or more organic acids such as fulvic acid and humic acid as discussed above. After the contaminated gas has been treated by passing through the water wash solution 102, the treated gas may pass through the baffle 108 or the like which can be provided in the head space 104 to help to remove some of the alkaline water wash solution remaining in the gas, and then the treated gas may be discharged from the reaction chamber at the upper portion 110 thereof. It is desirable for the treated gas to include as little water as possible.

As a flow of the contaminated gas is passed through the alkaline water wash solution in the reaction chamber, the s hydroxide compound(s) and/or other alkaline chemicals in the solution will react with contaminants in the gas, the pH and pKa of the solution will be progressively reduced so that there characteristics can be monitored as an indication of remaining strength of the solution 102. At step S3 it is determined if the pH of the solution is less than 9.0, at which point the solution 102 is considered to be mostly spent. If Yes, at step S4 the spent solution may be removed from the reaction chamber, e.g., through the waste discharge outlet 118 at the bottom of the reaction chamber. Any precipitates and other solids which have been released into from the treated contaminated gas into the solution 102 will tend to collect in the bottom of the reaction chamber and may be removed together with the spent solution 102. The process may then return to step S1 and another volume of the alkaline water wash solution may then be introduced into the reaction chamber, and the treatment process may continue by repeating these steps as long as desired.

Figure 3:
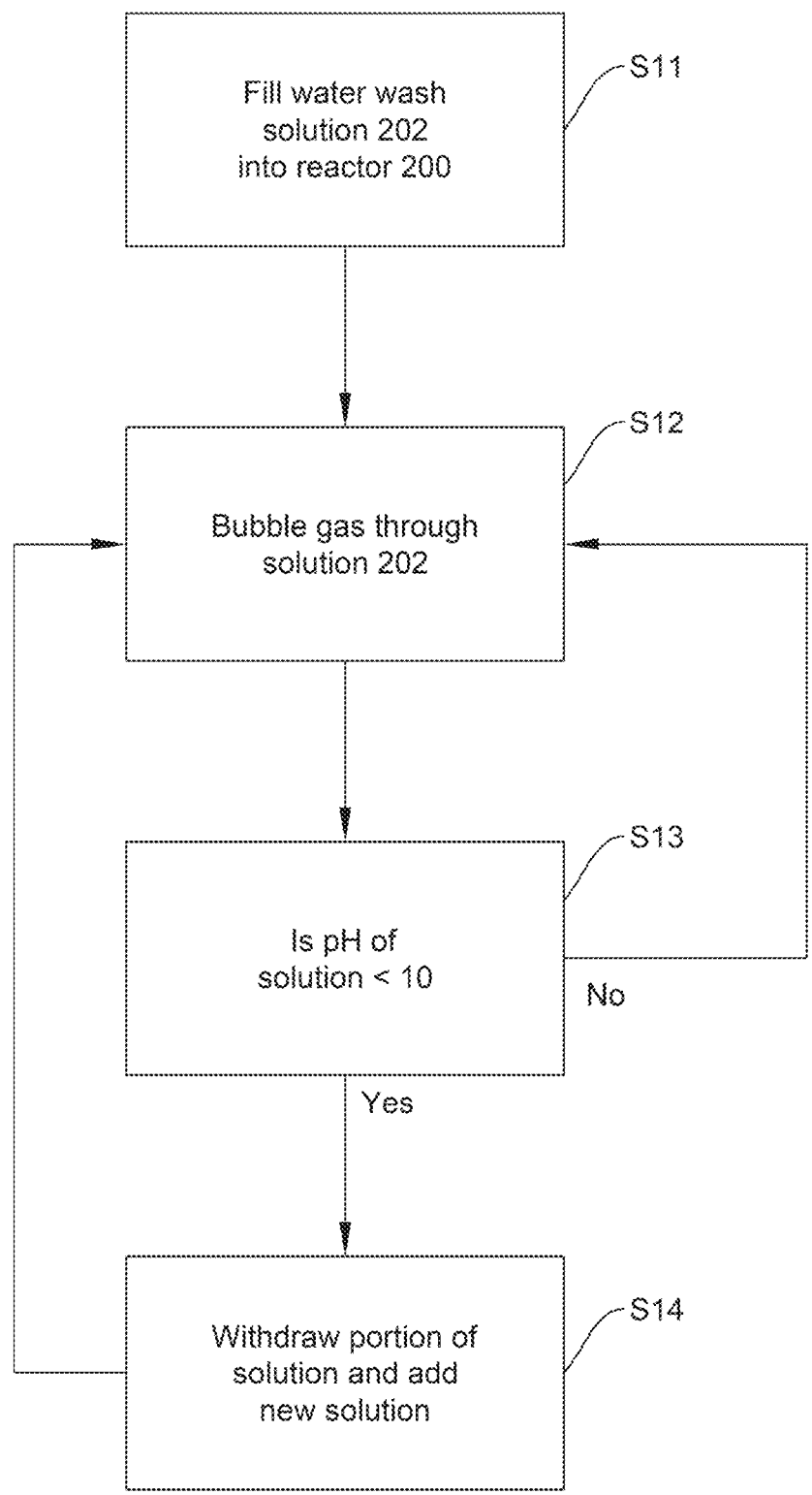
FIG. 3, is a flowchart of an exemplary embodiment of a continuous type treatment process for remediating contaminated gasses according to of the present invention using the treatment reaction chamber of FIG. 1.

Art exemplary embodiment of a continuous type treatment process for removing contaminants from contaminated gasses using the treatment system shown FIG. 1 is shown in FIG. 3. In this process the water wash solution 102 may be regularly refreshed when its pH drops to a pre-determined values such as below 10 or below 9, rather than being fully replaced as in the batch mode of FIG. 2. In such continuous process, it is desirable for the treatment solution to include an organic acid such as fulvic acid and/or humic acid in amounts as discussed herein in order to help limit the amount of precipitates and solids released from the treatment solution.

Referring to FIG. 3, the reactor 100 is partially filled with the water wash solution 102 at an initial pH of about 11 in step S11 and a flow of contaminated gas 105 is introduced into the reactor through the nozzle 106 in step S12. Again, pH and/or pKa may be monitored using sensor 116, and as the treatment process continues and the pH and pKa of the water wash solution 102 are reduced, the water wash solution may be regularly refreshed to maintain the solution in an appropriate condition for efficiently remediating the contaminated gasses. For such refreshing, the inventors have determined that once the pH drops below 10 this would be an appropriate point at which the water wash solution should be refreshed, particularly if the contaminated gas being remediated contains an amount of $H_2S$ exceeding 5 ppm, even though the used water wash solution may not be technically spent at this point. $H_2S$ content of natural gas directly from the earth may contain very high concentrations of $H_2S$, e.g., amounts of ≥60.000 ppm, and the treatment processes according to the embodiments of the present invention are effective for remediating such high levels of $H_2S$. The pH of the water wash solution must be above 9.95 in order for the solution to react with and remediate $H_2S$ in the contaminated gasses. Thus, at step S3 in the process it is determined if the pH of the solution is less than 10.0 every few milliseconds or so using the sensor 116. If Yes, at step S4 the water wash solution may be refreshed by withdrawing a portion, e.g., ⅟₂₀ to ⅛, of the reacted water wash solution in the reaction chamber through the discharge outlet 118, and introducing an equal amount of fresh water wash solution at a pH of about 11 into the reaction chamber through the inlets 112, 114. The used solution being withdrawn may contain some amount of solid matter dissolved and/or suspended therein and may correspondingly appear cloudy, and may be removed through the waste discharge outlet 118 at the bottom of the reaction chamber. If at S3 the answer is No the pH is not below 10.0, then the process returns to step S2 and the process continues. The treatment process may continue by repeating these steps as long as desired.

The inventors have conducted beta testing on the treatment process according to the present invention using the water wash solution with elevated pH and one or more organic acids such as fulvic acid and humic acid in amounts as discussed above for remediating contaminated natural gas from the earth. In such beta testing the flow of contaminated natural gas was about three (3) million $ft^3$/day or 125,000 $ft^3$/hour. However, it should be recognized that flow of natural gas from a given well is typically not at a steady or constant flow rate, but will typically vary throughout any 24 hour period, and the flow rate of the natural gas being treated in the treatment process according to exemplary embodiments of the present invention will correspondingly vary throughout any 24 hour period. The natural gas initially contained 60,000 ppm of $H_2S$ and about 160,000 ppm of $CO_2$, as well as several other contaminants including water, salts, other sulfur containing compounds such as mercaptans and thiophenes, BTEX chemical, and metals. The reactor or bubble tower 100 used for this treatment process had a reaction chamber volume of about 1000 US gallons, and was initially filled with about 600 US gallons of the novel water wash at an initial pH of about 11. As the contaminated natural gas was treated by being bubbled or passed through the water wash solution, the pH of the water wash solution was monitored via sensor 116 and each time the pH dropped below a threshold value of 10, the used water wash solution in the reaction chamber was refreshed with an amount of fresh water wash solution at a pH of about 11. For such refreshing, the pH variably tended to drop below 10 about every 40 to 90 minutes, and the refreshing process involved replacing about ⅟₁₀ of the total volume of the used water wash solution with fresh water wash solution, e.g., 60 gallons of the used water wash was withdrawn through the discharge port 118 and 60 gallons of fresh water wash solution 102 with pH of about 11 was introduced though one or more of the inlets 112, 114.

The beta testing ran for several months continuously without any significant complications, including that there was little blockage of the reactor and associated piping with precipitates. When the treated gas was analyzed it showed that the initial $H_2S$ content of the gas was reduced from 60 to 80%, the initial $CO_2$ content of the gas was reduced from 50 to 80%, and salt content of the gas was reduced to essentially 0%.

Figure 4:
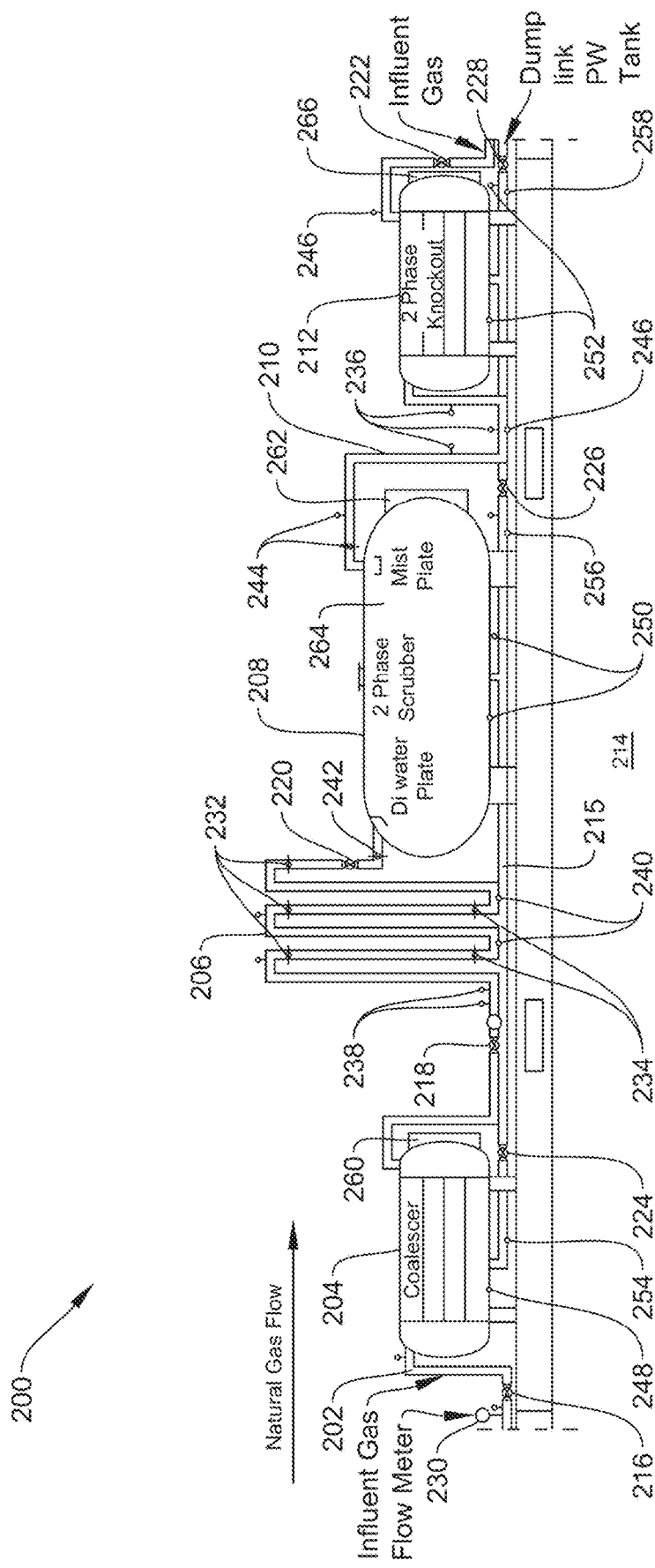
FIG. 4 is a schematic diagram of a treatment system for remediating contaminated gasses according to another exemplary embodiment of the present invention.
Figure 5:
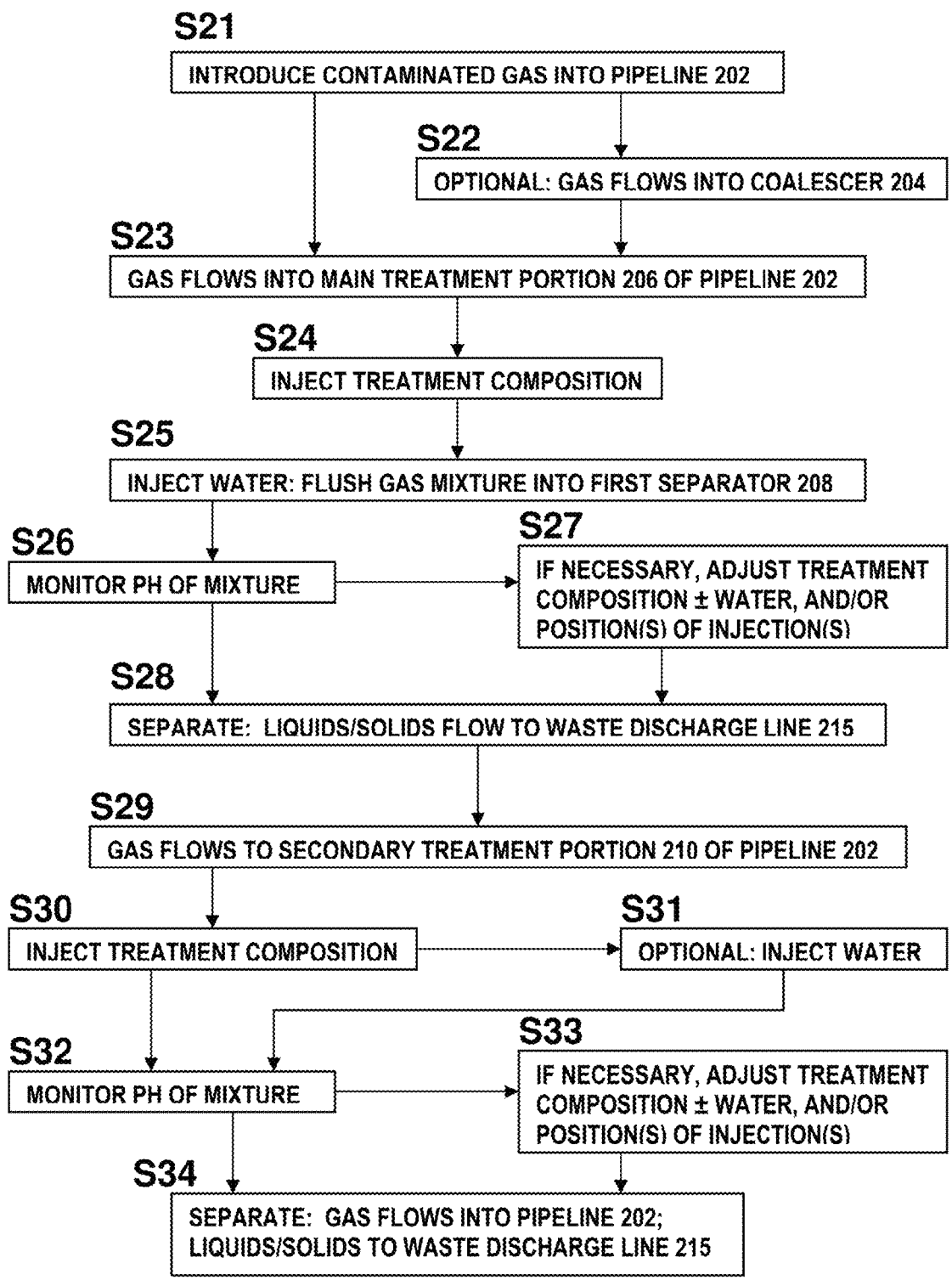
FIG. 5 is a flowchart of an exemplary embodiment of a treatment process for remediating contaminated gasses according to of the present invention using the treatment system of FIG. 3.

A third discovery by the present inventors is another new treatment system and process for treating contaminated gasses such as those discussed herein, including natural gas from wells, which is a type of hybrid between the water wash process according to the first embodiment discussed above and a continuous treatment process in which the contaminated gas is directly contacted with a liquid treatment composition having a very high concentration of hydroxide from one or more hydroxide compounds such as the treatment compositions disclosed in PCT/US2018/050913 and PCT/US2018/064015 and the '911 and '064 patents and variations thereof such as the variations discussed in relation to the other discussed embodiments of the present invention. The treatment compositions as disclosed in PCT/US2018/064015 and the '911 and '064 patents include small amounts of organic acids such as fulvic acid and humic acid, e.g., 0.01 to 3.0 wt % to help prevent release of precipitates and solids from treated liquids and gasses, and such amounts of the organic acids are appropriate for the treatment process according to the exemplary embodiment of the present invention based on the inventors' third discovery. The reactions between the treatment compositions and the contaminated gasses may be the same as those discussed in relation to the first embodiment of the present invention, noting that hydroxides are the main reactant in the modified water wash and the treatment compositions disclosed in PCT/US2018/050913 and PCT/US2018/064015 and the '911 and '064 patents. In this new treatment process and system the contaminated gas flows through a pipeline and portion(s) of the pipeline effectively function as reaction chamber(s) where the contaminated gas is remediated on a continuous basis. FIG. 4, is a schematic diagram of a treatment system for remediating contaminated gasses according to another exemplary embodiment of the present invention based on the inventors' third discovery and FIG. 5 is a flowchart of an exemplary embodiment of a treatment process for remediating contaminated gasses according to the present invention using the treatment system of FIG. 4. The treatment process of FIG. 4 may be operated on a continuous basis in which the contaminated gas flows through the pipeline continuously or substantially continuously, while amounts of the treatment composition(s) and water are separately injected into portions of the pipeline for treating the gas to remediate and remove contaminants in the gas, and the treated gas is quickly separated from the treatment composition, the water and any precipitates and solids released from the treated contaminated gas as it continues flowing.

In the treatment process of FIG. 4, an amount of liquid treatment composition that is injected into the flowing stream of the contaminated gas in the pipeline is based on the amount of the contaminated gas being treated and the types and amounts of contaminants in the contaminated gas. Any volume of contaminated gas may be treated, but for natural gas from one or more wells that are typically collected together in a given location, a typical daily output of the contaminated natural gas may be from 500,000 ft$^3$ to 5,000,000 ft$^3$, and the contaminants may include salts, $CO_2$, $H_2S$, $SO_2$, other sulfur based contaminants including mercaptans and thiophenes, and metals in varying amounts. Technically water may also be considered a contaminant in a gas, but for this disclosure water is not intended to be considered as one of the contaminants that are being remediated. For treating such volumes of contaminated natural gas, as well as other contaminated gasses, the inventors have determined that an appropriate amount of a treatment composition, such as those disclosed in PCT/US2018/050913 and PCT/US2018/064015, the '911 and '064 patents and variations thereof, is in a range of 1 to 150 US gallons/hour. These compositions will generally have a pH of 14 due to the high concentration of hydroxide compound(s) therein. In this new treatment process water is injected separately from the treatment composition into the contaminated gas flowing in the pipeline, preferably downstream of where the treatment composition is injected, although the water may be injected upstream, or both upstream and downstream, of the treatment composition. The amount of water injected in the pipeline may be the same or substantially the same as the amount of treatment composition injected, but may be significantly greater for purposes of flushing precipitates and solids released from the treated gas along the pipeline to prevent any buildup of these matters in the pipeline. The most appropriate amounts of the treatment composition to be used can be determined by monitoring pH, pKa and/or other characteristics of the treated contaminated gas and/or the liquids in the separator, and appropriate adjustments may be made to the treatment system and/or process based on the monitored characteristic(s). Similarly, the most appropriate amounts of water to be used may be determined based on whether or not any buildup of precipitates and solids in the pipeline is occurring and appropriate adjustments can be made based on this. Such adjustments may include adjusting the amount of treatment composition being injected in the treatment step, adjusting the amount of water being injected, adjusting the position of the pipeline where the treatment composition and/or the water is injected, etc. as discussed further herein.

Referring to FIG. 4, there is shown a treatment system 200 according to the exemplary embodiment of the present invention. The system 200 generally includes: piping 202 through which contaminated gas passes through the system from left to right in FIG. 4; a coalescer 204 which may be used to remove some impurities from the contaminated gas as it enters the system; a main treatment portion 206 of the pipeline in which treatment composition and water are injected to react with the gas as a primary treatment to remediate and remove much of the contaminants in the gas, including salts, $CO_2$, $H_2S$, other sulfur based contaminants including mercaptans and thiophenes, metals, $SO_2$, $NH_3$, etc.; a first separator 208 which separates the treated contaminated gas from liquids and precipitates and solids released via the treatment in the main treatment portion 206 of the pipeline; a secondary treatment portion 210 of the pipeline in which the treated contaminated gas is treated a second time to remove most or all of the remaining contaminants in the once treated contaminated gas, which may include $H_2S$ and $CO_2$; a second separator 212 which separates the twice treated contaminated gas from liquids and precipitates and solids released via the treatment in the secondary treatment portion 210 of the pipeline; and a waste discharge line 215 into which liquids and solids separated from the contaminated gas in the coalescer 204, the first separator 208 and the second separator 212 may be discharged for disposal or for further processing.

The system 200 may be automated using a controller 214 which receives various inputs from sensors which sense the flowrates of the contaminated gas, the treatment composition and water entering and passing through the system 200, and other sensors which monitor characteristics of the contaminated gas, the treatment composition and water, including pH, pKa, etc., at various positions of the system, and controls various valves provided at different locations of the system which control the flow of the contaminated gas and liquids entering into the system and being discharged from the system. Such valves may be solenoid controlled valves. The controller 214 may be an electronic control unit (ECU) programmed to control the system 200, and may include a memory (not shown) storing predetermined data such as proper amounts of treatment composition and water to be injected based on flowrate and contamination amounts in the contaminated gasses, etc. As depicted in FIG. 4, for example, there may be a valve 216 which controls flow of contaminated gas into the system, a valve 218 between the coalescer 204 and the main treatment portion 206 of the pipeline which controls flow of contaminated gas into the portion 206, a valve 220 at the end of the main treatment portion 206 of the pipeline which controls flow of treated contaminated gas from the portion 206 into the first separator 208, a valve 222 which controls the flow of treated contaminated gas from the system, and valves 224, 226 and 228 provided along the waste discharge line 215 which control discharge of liquids and solids from the coalescer 204, the first separator 208 and the second separator 212. Other valves may be provided in the system as desired or necessary although such valves are not depicted in FIG. 4, e.g., valves for controlling injection of the treatment composition and water into the system at various positions, e.g., positions 232, 234 in the main treatment portion 206 of the pipeline 202 and positions 236 of the secondary treatment portion 210 of the pipeline, noting that the positions at which the treatment composition and water are injected into these treatment portions of the pipeline may be varied as necessary or desired for most efficiently and effectively treating the contaminated gas as discussed further herein.

The sensors may include a flowmeter 230 provided at the entrance to the pipeline 202 for sensing the flowrate of the contaminated gas entering the system 200, which may vary even as the treatment system is continuously run. Although not depicted in FIG. 4, other flowrate sensors may be provided for determining the flowrate of the contaminated gas after it is treated and released at various portions of the system, as well as the flowrates of the treatment composition and water being injected into the system, although the volume of the contaminated gas entering the system should be about the same as the volume of the gas passing through the different portions of the system. The sensors may also include pH and/or pKa sensors provides at several positions of the system, e.g., sensors 238 for sensing the contaminated gas entering the main treatment portion 206, sensors 240 sensing the treated contaminated gas, treatment composition and water at various positions of the main treatment portion 206, sensor 242 sensing treated contaminated gas, treatment composition and water entering the first separator 208, sensors 244 sensing the once treated contaminated gas discharged from the first separator, sensor 246 sensing the treated contaminated gas and treatment composition in the secondary treatment portion 210, sensor 246 sensing the twice treated contaminated gas being discharged from the second separator 212, sensors 248, 250 and 252 respectively sensing fluids in the coalescer 204, the first separator 208 and the second separator 212, and sensors 254, 256 and 258 respectively sensing the liquids and solids in the waste discharge line 215 respectively downstream of the coalesce 204, first separator 208 and second separator 212. Other sensors may be provided as desired or necessary.

The piping 202, including the portions of the piping which function as the main treatment portion 206 and the secondary treatment portion 210 can be of any size/diameter appropriate to handle the flow of contaminated gas, e.g., if contaminated natural gas from one or more wells is to be treated the flow may be 500,000 ft$^3$ to 5,000,000 ft$^3$/day, as well as amounts of treatment composition and water which are to be injected into the piping for treating the contaminated gas, e.g., 1 to 150 US gallons/hour of each of the treatment composition and water. The piping may be made of any appropriate material such as steel, stainless steel, galvanized steel, etc. The specific volume of the contaminated gas will also vary depending on the pressure of the gas, noting that the higher the pressure the smaller the volume and flowrate of the gas. This is important because the flow rate of the contaminated gas affects its contact time with the treatment composition. The contaminated gas should have a sufficient contact time with the liquid treatment composition for being properly remediated, e.g., 0.2 to 5.0 seconds, and preferably at least 0.5 second. Typical pressure of contaminated natural gas from wells is 35 to 100 PSI, although the piping 202 and other components of the system can handle much higher pressures, e.g., 1800 PSI. The system may operate at any appropriate temperature, e.g., ambient temperature or higher. Contaminated natural gas from a well may be at a temperature of 65 to 100° F.

The coalescer 204 may be of an appropriate size to handle the volume of contaminated gas which may be used to remove some impurities from the contaminated gas as it enters the system. The coalescer is a type of separator for removing some types of contaminants from the contaminated gas, e.g., some water and some relatively large size impurities such as sand. The coalescer may include a site glass 260 for viewing by an operator. The coalesce 204 may be omitted depending on the amounts and types of contaminants in the contaminated gasses.

The main treatment portion 206 of the piping is effectively a reactor in which the contaminated gas is treated with the treatment composition and water and can have any appropriate length, e.g., 10 to 50 feet. As shown, the piping of the main treatment portion 206 may include a series of longer segments which extend vertically and which are continuously connected together by shorter segments in a repeating pattern such that the contaminated gas, together with the treatment composition and water injected into the gas in the main treatment portion 206, may flow upward, across and downward when passing through the main treatment portion. The treatment composition may be injected at various positions of the portion 206, which provides flexibility for achieving optimal results. The amount of treatment composition and water injected into the main treatment portion will vary depending on the amount of contaminated gas being treated and the types and amounts of contaminants in the gas. The most appropriate amounts of treatment composition and water may be determined based on pH or pKa of the treated contaminated gas entering or in the first separator 208. Generally, the treatment composition may be very quickly spent after it is injected into the main treatment portion 206 and mixes with the contaminated gas, e.g., within less than one second, and the pH of the combined fluids in the first separator 208 may be 9 to 11. It is desirable for the pH of the fluids in the first separator not to exceed 11 because this would indicate the treatment composition is not substantially fully spent, and the waste being discharged from the first separator may contain a significant amount of unused treatment composition. The treatment composition may be injected as fine liquid droplets through appropriate injectors into portions of the pipeline so that the treatment composition rapidly mixes into the contaminated gas. The water may also be injected as fine droplets through an appropriate injectors.

The amount of treatment composition to be injected may be adjusted depending on the level of contamination reduction desired, e.g., 40-80 wt % and/or volume % of the contaminants may be remediated or removed depending on the amount of treatment composition used. It may be desirable to achieve a lower level of contamination reduction if the treated contaminated gas will be accepted for use or further treatment at the lower level of contamination reduction. For contaminated natural gas from a well, a main objective may be for the well to simply be operating and if this can be permitted with a smaller level of contamination reduction this may be desired because of the lower cost based on less treatment composition being used. If it is desired to remove as much of the contamination as possible in the main treatment portion 206, then it would be desirable to inject as much of the treatment composition without the pH of the mixed fluids in the first separator exceeding 11. Also, the flow rate of the contaminated gas may vary as the system is being operated on a continuous basis, whereby it may be necessary to adjust the flow rate of the treatment composition based on the flowrate of the gas.

The flowrate of water being injected into the main treatment portion 206 of the pipeline may be similar to the flowrate of the treatment composition, but can be different. The water may be injected into the main treatment portion 206 at position(s) upstream and/or downstream of the position(s) where the treatment composition is injected, but position(s) downstream are particularly appropriate because the main function of the injected water is to flush any precipitates and solids that are released from the treated contaminated gas completely through the main treatment portion 206 and into the first separator 208. The inventors have determined that if the water is injected upstream of where the treatment composition is injected, this may require twice as much treatment composition to achieve a given level of contamination reduction compared to if the water is injected downstream of where the treatment composition is injected. Flowrate of the water may be increased to be higher and substantially higher than the flowrate of the treatment composition if desired or necessary to assure that precipitate and solids do not accumulate in the main treatment portion, e.g., the flowrate of the water may be increased to 10 times the amount of treatment composition and more, at least periodically for a short time period such as a minute or less to assure that the main treatment portion 206 of the pipeline 202 is properly flushed to prevent accumulation of any precipitates and solids. The water used in the system may be potable water, which is advantageous because potable water can take in more of the precipitates and solids released from the treated contaminated gas, including salts, although other water such as surface water, may be used is potable water is unavailable. As in the treatment process according to other embodiment of the present invention discussed herein the water may also include an anti-bacterial agent such as copper sulfate and potassium silicate, particularly if potable water is not available.

Distance between position(s) where the treatment composition is injected into the main treatment portion 206 and position(s) where water is injected into the portion 206 depends on several factors, e.g., how fast the contaminated gas is flowing in the pipeline, and the types and amounts of contaminants in the gas. The inventors have determined that contact time of at least 0.2 and preferably at least 0.5 second is sufficient for the treatment compositions to sufficiently remediate a large amount, e.g., 50 to 80 wt % of the contaminants in the contaminated gasses while substantially depleting most of the reactiveness of the treatment composition. Thus, if the contaminated gas is flowing at 3-10 ft/second, the distance between the positions where the treatment composition and the water are injected into the pipeline may be 0.6 to 3.0 feet. Generally, the distance should be at least 3 to 5 inches. The water injected into the pipeline will dilute any remaining amount of the treatment composition so that the treatment composition may continue to remediate the remaining contaminants until all the fluids are separated in the first separator 208. The precipitates released from the contaminated gasses may include salt, carbonate crystals, sulfur, sulfur containing compounds, metals, etc., and the precipitates will typically flow along with the injected water and the liquid treatment composition, into the first separator 208 where the treated contaminated gas is separated from the these liquids and the precipitates.

If water is injected into the portion 206 downstream of position(s) where the treatment composition is injected, distance between the most downstream position of the water injection and the first separator 208 can vary, but it is generally desirable to separate the treated contaminated gas from the liquids and precipitates quickly after the treatment composition and water are injected into the main treatment portion 206, so that such distance may be as little as 1 to 25 feet. The same applies if the treatment composition is injected into the portion 206 downstream of position(s) where water is injected The first separator 208 may be a two phase scrubber. After the treated contaminated gas, liquids and precipitates enter the first separator, the treated contaminated gas is discharged into the piping 202 at an upper portion of the separator and flows into the secondary treatment portion 210 of the pipeline, while the liquids, precipitates and solids are discharged into the waste discharge line 215 at the bottom of the separator to be disposed of or collected and further processed if desired. It is desirable for the treated contaminated gas to contain as little liquids as possible so that a baffle 264 or the like may be provided to strip liquids from the treated gas before it is discharged into the pipeline 202. The first separator 208 may include a site glass 262.

The secondary treatment portion 210 of the pipeline may not be as long as the main treatment portion 206 because the treated contaminated gas will have much of the contaminants originally therein removed when the treated gas enters the portion 210, so that there will be much less precipitates and solids discharged from the once treated contaminated gas as the gas is secondarily treated in the portion 210. For example, the portion 210 may be ½ as long as the portion 206. As shown, the piping of the secondary treatment portion 210 may include a plurality of longer segments which extend vertically and which are continuously connected together by a shorter segment such that the contaminated gas, together with the treatment composition and any water injected into the gas in the secondary treatment portion 210, may flow downward, across and upward when passing through the secondary treatment portion. Also, the treatment composition only may be injected into the portion 210 as this may be sufficient to prevent any accumulation of precipitates and solids in the portion 210. However, both the treatment composition and water may be injected into the secondary treatment portion 210 of the pipeline 202 if desired. The amount of the treatment composition added in the secondary treatment portion 210 may be significantly less than the amount of the treatment composition added in the main treatment portion 206, e.g. ≤⅕ of the amount injected in the main treatment portion for the same amount of the gas because most of the contaminants are remediated/removed from the contaminated gas in the first treatment portion 206. If water is also injected into the secondary treatment portion 210, again lesser amounts of water may be injected in comparison to the amount of water injected in the main treatment portion 206, e.g. ≤⅕ of the amount injected in the main treatment portion for the same amount of the gas. Relative distances between the position(s) where the treatment composition and water are injected into the secondary treatment portion 210, and relative distance between the last injection position in the secondary treatment portion and the second separator may be substantially the same as discussed relative to the main treatment portion 206 and the first separator. However, if only treatment composition is injected into the secondary treatment portion 210 the primary consideration for adjustment is the distance between where the composition is injected into the portion 210 and the second separator 212.

The secondary treatment portion 210 may be effective to remove all or substantially all of the remaining contaminants in the once treated contaminated gas that has already been treated in the main treatment portion 206. Just how much of the remaining contaminants are removed in the secondary portion 210 is variable depending on how much of the treatment composition is injected into the gas as it passes through the portion 210. Again, it may not be desired to remove all of the remaining contaminants due to cost or other considerations. Also, the secondary treatment portion 210 and the second separator 212 may be omitted from the system if the amount of contaminant reduction achieved in the main treatment portion 206 and the first separator is sufficient. The most appropriate amounts of treatment composition and water to be injected in the secondary treatment portion 210 may be determined based on pH or pKa of the treated contaminated gas entering or in the second separator 212. Similar to the main treatment portion 206, the treatment composition is very quickly spent after it is injected into the secondary treatment portion 210 and mixes with the contaminated gas, e.g., within less than one second. The pH of the combined fluids in the second separator 212 may be 10 to 11. It is desirable for the pH of the fluids in the second separator not to exceed 12 because this would indicate the treatment composition is not substantially fully spent, and the waste being discharged from the first separator may contain a significant amount of unused treatment composition.

The second separator 212 may be a two phase scrubber or a two phase knockout type separator. After the twice treated contaminated gas, liquids and precipitates enter the second separator 212 the gas is discharged into the piping 202 at an upper portion of the second separator and may be discharged from the system 100 for direct use or further processing, while the liquids, precipitates and solids are discharged into the waste discharge line 215 at the bottom of the separator to be disposed of or collected and further processed if desired. It is desirable for the twice treated contaminated gas discharged from the second separator to contain as little liquids as possible so that a baffle or the like (not shown) may be provided to strip liquids from the treated gas before it is discharged into the pipeline 202. The second separator 212 may include a site glass 262.

Referring to FIG. 5 there is shown a flowchart of an exemplary embodiment of a continuous treatment process for remediating contaminated gasses according to of the present invention using the treatment system of FIG. 4. In step S21 of the treatment process the contaminated gas is introduced into the pipeline as a flowing stream. If a coalescer 204 is used the gas stream flows into the coalescer in step S22 so that some contaminants such as sand and some water may be removed from the gas. In step S23 the contaminated gas flows into the main treatment portion 206 of the pipeline, at step S24 the treatment composition, such as any of those disclosed in PCT/US2018/050913 and PCT/US2018/064015 and the '911 and '064 patents and variations thereof, is injected into the gas at an appropriate rate as discussed herein, which depends on the flowrate and characteristics of the contaminated gas, at appropriate position(s) of the main treatment portion 206 such that the liquid treatment composition mixes into the contaminated gas in the flowing stream and remediates contaminants in the contaminated gas, and at step S25 water is injected into the gas in at an appropriate rate as discussed herein depending on the flowrate and characteristics of the gas, at appropriate position(s) of the main treatment portion 206 downstream of where the treatment composition is injected such that the water also mixes into the contaminated gas and treatment composition in the flowing stream and helps to flush the treatment composition, the treated gas, and any precipitates and solids released from the treated gas through the main treatment portion 206 and into the first separator 208. At step S26 characteristics of the mixture of treated contaminated gas, treatment composition, water, precipitates and solids are monitored for pH, and if necessary, at step S27 adjustments may be made to the amount(s) and injection positions(s) of the treatment composition and water. At step S28 the once treated contaminated gas is separated from the liquids and solids in the first separator 208 such that the treated gas flows into the secondary treatment portion 210 of the pipeline, while the liquid and solid matters are discharged into the waste discharge line 215. The process may be terminated at this point if the amount of contaminant reduction achieved in the main treatment portion 206 is sufficient.

If the secondary treatment portion 210 and the second separator 212 are to be included and used for a second treatment of the contaminated gas, At step S29 the contaminated gas discharged from the first separator 208 flows into the secondary treatment portion 210 of the pipeline 202, at step S30 the treatment composition, which can be the same as or different from that injected into the main treatment portion 206, is injected into the gas at an appropriate rate as discussed herein at appropriate position(s) of the secondary treatment portion 210 such that the liquid treatment composition mixes into the contaminated gas in the flowing stream and further remediates any contaminants remaining in the contaminated gas. If any water is desired for flushing the secondary treatment portion 210, at step S31 the water is injected into the gas in at an rate and at appropriate position(s) of the secondary treatment portion 210 as discussed herein such that the water also mixes into the contaminated gas and treatment composition in the flowing stream and helps to flush the treatment composition, the treated gas, and any precipitates and solids released from the treated gas through the secondary treatment portion 210 and into the second separator 212. Again, water is optional for the secondary treatment portion 210, so that step S31 may be omitted, so that only the twice treated contaminated gas, the treatment composition, and any further precipitates and solids released from the twice treated gas flow into the second separator 212. If the treatment composition includes an organic acid such as fulvic acid and humic acids as discussed herein, there may be little or no precipitates and solids released from the twice treated gas in the secondary treatment portion 210. At step S32 characteristics of the mixture of the twice treated contaminated gas, treatment composition, water, precipitates and solids entering into or in the second separator 212 are monitored for pH, and if necessary depending on the pH, at step S33 adjustments may be made to the amount(s) and injection positions(s) of the treatment composition and/or water in the secondary treatment portion 210. At step S34 the treated contaminated gas is separated from the liquids and solids in the second separator 212 such that the treated gas flows into the pipeline 202, while the liquid and solid matters are discharged into the waste discharge line 215 for disposal or further treatment. The twice treated contaminated gas discharged from the second separator 212 may be largely free of any contaminants and process may be terminated at this point.

The treatment system and process according to the exemplary embodiment of the present invention shown in FIG. 5 using the exemplary embodiment of the treatment system in FIG. 4 is very advantageous over conventionally known treatment systems and processes for treating contaminated gasses. With the new process the inventors have been able to successfully treat highly contaminated gasses, including natural gas, in a practical, cost effective manner in a continuous treatment process, where the conventionally known treatment systems and processes were unable to do so. For example, the inventors have run the new treatment system and process in relation to large volumes of highly contaminated natural gas, e.g., daily volumes of 500,000 ft$^3$ to 5,000,000 ft$^3$, containing large amounts of $H_2S$, $CO_2$, as well as other contaminants including salts, metals, other sulfur containing substances, etc., and have achieved 40 to almost 100% remediation of contaminants in an efficient, cost effective manner. Conversely, this same highly contaminated natural gas could not be treated in a practical, cost efficient manner using the conventionally known treatment systems and processes. The owners of the wells which output the highly contaminated natural gas were essentially forced to shut down these wells because of their inability to treat the highly contaminated natural in a practical, cost efficient manner, whereby the owners also could not extract the crude oil which would be output by the same wells together with the highly contaminated natural gas.

Further, the treatment system and process according to this exemplary embodiment is quite flexible in terms of the extent to which contaminants in the highly contaminated gasses, including natural gas, is remediated using the new system and process. For example, in their treatment of the highly contaminated natural gas, the present inventors are able to adjust the system and process to achieve different levels of remediation, which may be desired in any given situation. For contaminated natural gas, it is often sufficient to reduce the levels of contaminants, particularly $H_2S$, by 40-80 wt % or volume % in order for the contaminated gas to be accepted by a refiner, which will further remediate the contaminants as necessary or desired. Although such partially remediated natural gas may still be considered as "sour", it can be extracted from the wells and sold for use or further refining, while the ability to extract the natural gas also permits crude oil to be extracted from the wells. Further, it is possible to achieve complete or almost complete remediation of the contaminants in the highly contaminated natural gas if the first and second treatment and separation steps using both the main treatment portion 206 and secondary treatment portion 210 are used. Thus, the level of remediation achieved by the treatment system and process can be easily adjusted depending on customer demands and desires.

As will be appreciated the treatment process using the alkaline water wash solution according to the embodiment of the present invention can be effectively and economically used for removing contaminants from a variety of contaminated gasses. The natural gas industry is major example, again, noting that there no known, conventional process prior to the present invention that can effectively treat some of the highly contaminated natural gas from existing wells and known deposits in the earth in a practical, cost effective manner, such that there are many capped wells and un-tapped deposits around the world. Another type of contaminated gas that many be efficiently and cost-effectively treated using the alkaline water wash solution according to the embodiment of the present invention are combustion gasses from fossil fuels such as coal, and petroleum based liquids and gasses, which typically include large amounts of $CO_2$, $SO_2$, etc. as used in various industries including electricity producing plants. Thus, for example, this treatment process may be cost-effectively used as a carbon sequestration/carbon mitigation strategy, noting that if a power plant burning fossil fuels continuously outputs combustion gasses containing 80,000 ppm of $CO_2$ at thirteen (13) million ft$^3$/day is treated using the treatment process this will remove 57,058 kg or 63 tons/day of $CO_2$ from the gasses. Currently, governments award industries carbon credits for reducing emissions of $CO_2$, and such credits can amount to very substantial money. The same reasoning applies to $SO_2$ and other contaminants commonly contained in gasses.

The foregoing description is given for clearness of understanding only, and no unnecessary limitations should be understood therefrom, as modifications within the scope of the invention may be apparent to those having ordinary skill in the art and are encompassed by the claims appended hereto.

We claim:

1. A treatment process for removing and/or remediating contaminants in a contaminated gas, comprising steps of:
    flowing a stream of the contaminated gas through a pipeline;
    treating the flowing stream of the contaminated gas by injecting droplets of an aqueous liquid treatment composition containing 35-55 wt % total of one or more hydroxide compounds into the flowing the stream of the contaminated gas in the pipeline such that the liquid treatment composition mixes into the contaminated gas in the flowing stream and remediates contaminants in the contaminated gas;
    injecting water into the mixed flowing the stream of the contaminated gas and the liquid treatment composition in the pipeline downstream of where the liquid treatment composition is injected into the pipeline; and
    separating the flowing stream of the treated contaminated gas from any remaining amount of the liquid treatment composition, the water and any precipitates and solids released from the contaminated gas in the treatment step in a separator.

2. The treatment process according to claim 1, wherein the process is run in a continuous manner, an amount of the stream of flowing contaminated gas is 500,000 ft$^3$ to 5,000,000 ft$^3$/day, an amount of the treatment composition injected in the treatment step is 1 to 150 US gallons/hour, and an amount of the water injected in the water injection step is 1 to 150 US gallons/hour.

3. The treatment process according to claim 1, wherein the aqueous liquid treatment composition further comprises at least one of fulvic acid and humic acid in an amount of 0.005 to 3.0 weight %.

4. The treatment process according to claim 1, wherein the aqueous liquid treatment composition contains 45-55 wt % total of one or more hydroxide compounds.

5. The treatment process according to claim 1, wherein a distance between a position of the pipeline where the aqueous liquid treatment composition is injected in the treatment step and a position of the pipeline where the water is injected in the water injection step is based on a flowrate of the contaminated gas in the pipeline, and is sufficient for the contaminated gas to be in contact with the aqueous liquid treatment composition for 02, to 1.0 seconds before the water is injected in the water injection step.

6. The treatment process according to claim 1, wherein a distance between a position of the pipeline where the aqueous liquid treatment composition is injected in the treatment step and a position of the pipeline where the water is injected in the water injection step is at least 3 inches.

7. The treatment process according to claim 1, wherein a distance between a position of the pipeline where the water is injected in the water injection step and the separator is 1-25 feet.

8. The treatment process according to claim 1, further comprising steps of: monitoring pH of the treated contaminated gas, the aqueous liquid treatment composition and the water entering or in the separator; and adjusting at least one of the amount of the aqueous liquid treatment composition is injected in the treatment step, the amount of water injected in the water injection step, a position of the pipeline at which the aqueous liquid treatment composition is injected in the treatment step, and a position of the pipeline at which the water injected in the water injection step based on the monitored pH.

9. The treatment process according to claim 1, further comprising step of periodically increasing a an amount of water injected into the pipeline for time periods of less than 5 minutes.

10. The treatment process according to claim 1, further comprising steps of:
secondarily treating the treated contaminated gas after it is discharged from the separator into the pipeline by injecting droplets of an aqueous liquid treatment composition in a portion of the pipeline downstream of the separator such that the liquid treatment composition mixes into the once treated contaminated gas in the flowing stream and further remediates contaminants in the once treated contaminated gas;
separating the flowing stream of the secondarily treated contaminated gas from any remaining amount of the liquid treatment composition and any precipitates and solids released from the secondarily treated contaminated gas in the secondary treatment step treatment step in a second separator.

11. The treatment process according to claim 10, wherein a distance between a position of the pipeline where the treatment composition is injected in the secondary treatment step and the second separator is 1-25 feet.

12. The treatment process according to claim 10, wherein an amount of treatment composition injected in the secondary treatment step is ≤⅕ of an amount of the treatment composition injected in the treatment step.

13. The treatment process according to claim 2, wherein the contaminated gas is natural gas from a well.

14. The treatment process according to claim 1, wherein a portion of the pipeline in which the aqueous treatment composition and water are injected into the treating and injecting steps includes a series of longer segments which extend vertically and which are continuously connected together by shorter segments in a repeating pattern.

15. A treatment system for removing and/or remediating contaminants in a contaminated gas, comprising:
a pipeline which is configured to receive a flowing stream of the contaminated gas therethrough;
a portion of the pipeline having at least one injection port through which droplets of an aqueous liquid treatment composition containing 35-55 wt % total of one or more hydroxide compounds may be injected into the flowing the stream of the contaminated gas in the pipeline such that the aqueous liquid treatment composition mixes into the contaminated gas in the flowing stream and remediates contaminants in the contaminated gas;
the portion of the pipeline having at least one other injection port through which droplets of water may be injected into the pipeline such that the water mixes with flowing the stream of the contaminated gas and the aqueous liquid treatment composition in the pipeline, the at least one other injection port being located downstream of a position of the at least one injection port; and
a separator located downstream of a position of the at least one injection port injection port and configured to separate the flowing stream of the treated contaminated gas from any remaining amount of the liquid treatment composition, the water and any precipitates and solids released from the contaminated gas.

16. The treatment system according to claim 15, wherein a distance of the pipeline between the at least one injection port and the at least one other injection port is determined based on a flowrate at which the contaminated gas may flow through the pipeline, and is sufficient for the contaminated gas to be in contact with the aqueous liquid treatment composition injected through the at least one injection port for 02, to 1.0 seconds before the water is injected through the at least one other injection port.

17. The treatment system according to claim 15, wherein a distance of the pipeline between the at least one injection port and the at least one other injection port is at least 3 inches.

18. The treatment system according to claim 15, wherein a distance between a position of the at least one other injection port and the separator is 1-25 feet.

19. The treatment system according to claim 15, further comprising:
a second portion of the pipeline located downstream of the separator and having at least one injection port through which droplets of the aqueous liquid treatment composition may be injected into the flowing the stream of the contaminated gas in the pipeline such that the aqueous liquid treatment composition mixes into the contaminated gas in the flowing stream and further remediates contaminants in the contaminated gas; and
a second separator located downstream of the second portion of the pipeline and configured to separate the flowing stream of the treated contaminated gas from any remaining amount of the liquid treatment composition, and any precipitates and solids released from the further remediated contaminated gas.

20. The treatment system according to claim 19, wherein a distance between a position of the second portion of the pipeline and the second separator is 1-25 feet.

21. The treatment system according to claim 15, having more than one said at least one injection port and having more than one said at least one other injection port.

22. The treatment system according to claim 15, wherein the portion of the pipeline includes a series of longer segments which extend vertically and which are continuously connected together by shorter segments in a repeating pattern.

* * * * *